(12) United States Patent
Betro

(10) Patent No.: US 9,752,840 B1
(45) Date of Patent: Sep. 5, 2017

(54) INTERNET OF THINGS (IOT) AUTOMATED INTELLIGENCE MODULE (AIM) AND MANAGEMENT SYSTEM

(71) Applicant: ZEROIN PRECISION SYSTEMS, LLC, Silver Spring, MD (US)

(72) Inventor: Jonpaul Betro, Frederick, MD (US)

(73) Assignees: Jonpaul Betro, Frederick, MD (US); Zeroin Precision Systems, LLC, Silver Spring, MD (US)

( * ) Notice: Subject to any disclaimer, the term of this patent is extended or adjusted under 35 U.S.C. 154(b) by 0 days.

(21) Appl. No.: 15/146,353

(22) Filed: May 4, 2016

Related U.S. Application Data

(60) Provisional application No. 62/156,938, filed on May 5, 2015.

(51) Int. Cl.
| | |
|---|---|
| *F41A 17/00* | (2006.01) |
| *F41A 17/06* | (2006.01) |
| *H04W 4/02* | (2009.01) |
| *H04W 4/22* | (2009.01) |

(52) U.S. Cl.
CPC ............ *F41A 17/063* (2013.01); *F41A 17/06* (2013.01); *H04W 4/028* (2013.01); *H04W 4/22* (2013.01)

(58) Field of Classification Search
CPC .......... H04M 1/00; H04M 1/725; H04M 4/02; H04M 4/021; H04M 11/04; H04M 11/045; H04W 4/02; H04W 4/005; H04W 4/008; H04W 4/025; G08B 25/016; G08B 15/00; G08B 15/001; G08B 13/1672; G01S 19/13; G01S 19/14; G01S 19/17; G01S 19/18; H04N 5/77; H04N 5/772; F41A 17/066; F41A 17/063; F41A 17/00; F41A 17/06; F41A 19/00; F41A 19/10; F41A 19/11; F41A 19/15
See application file for complete search history.

(56) References Cited

U.S. PATENT DOCUMENTS

| | | | |
|---|---|---|---|
| 8,339,257 | B2 | 12/2012 | Cazanas et al. |
| 8,819,979 | B2 | 9/2014 | Kelly |
| 9,591,255 | B2 * | 3/2017 | Sakiewicz .............. H04N 5/772 |
| 2014/0290110 | A1 | 10/2014 | Stewart et al. |
| 2015/0369554 | A1 | 12/2015 | Kramer |

(Continued)

*Primary Examiner* — Van Trieu
(74) *Attorney, Agent, or Firm* — Rosenberg, Klein & Lee

(57) ABSTRACT

An Internet of Things (IoT) Automated Intelligence Module (AIM) (or sensor module) is mounted on a firearm to gather weapons intelligence data (including video/audio data) when a critical event, such as the firearm un-holstering, and/or discharge, as well as emergency situation, is (are) detected. The IoT sensor module is capable of immediate detection of un-holstering of the firearm, firearm discharge(s), the number of the discharges, as well as 3-D positioning of the firearm at the time of discharge, and notification alerts to designated recipients (i.e., computer aided dispatch, commanders, supervisors, superintendents, etc.) of the firearm status change or critical events in the field. The captured video/audio and the weapon's intelligence data are transmitted to end-users' application desktops, mobile devices, and/or web-based interfaces to provide the designated recipients with situational awareness of personnel in the field and crucial information that can be used for post crime scene analysis.

20 Claims, 18 Drawing Sheets

(56) References Cited

U.S. PATENT DOCUMENTS

2016/0165192 A1* 6/2016 Saatchi ................ F41A 17/063
  386/227
2016/0173832 A1* 6/2016 Stewart ................ F41A 17/20
  348/158

* cited by examiner

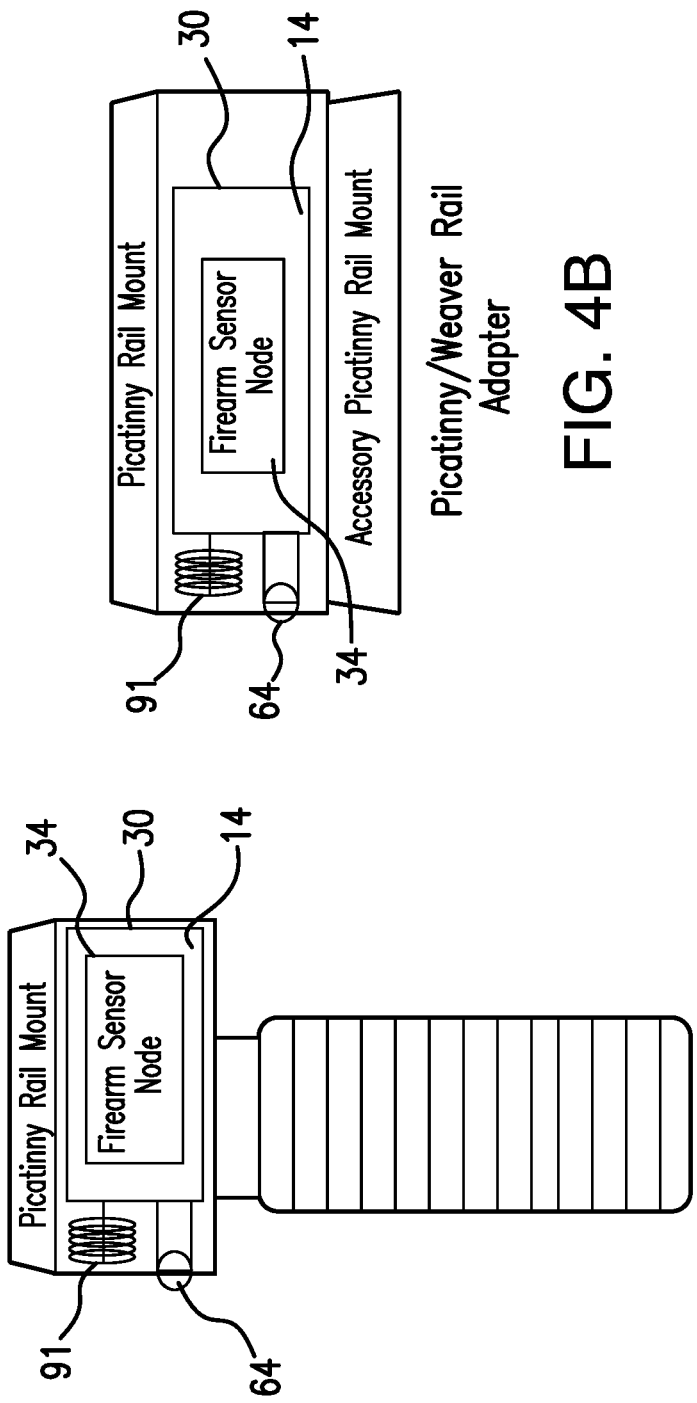

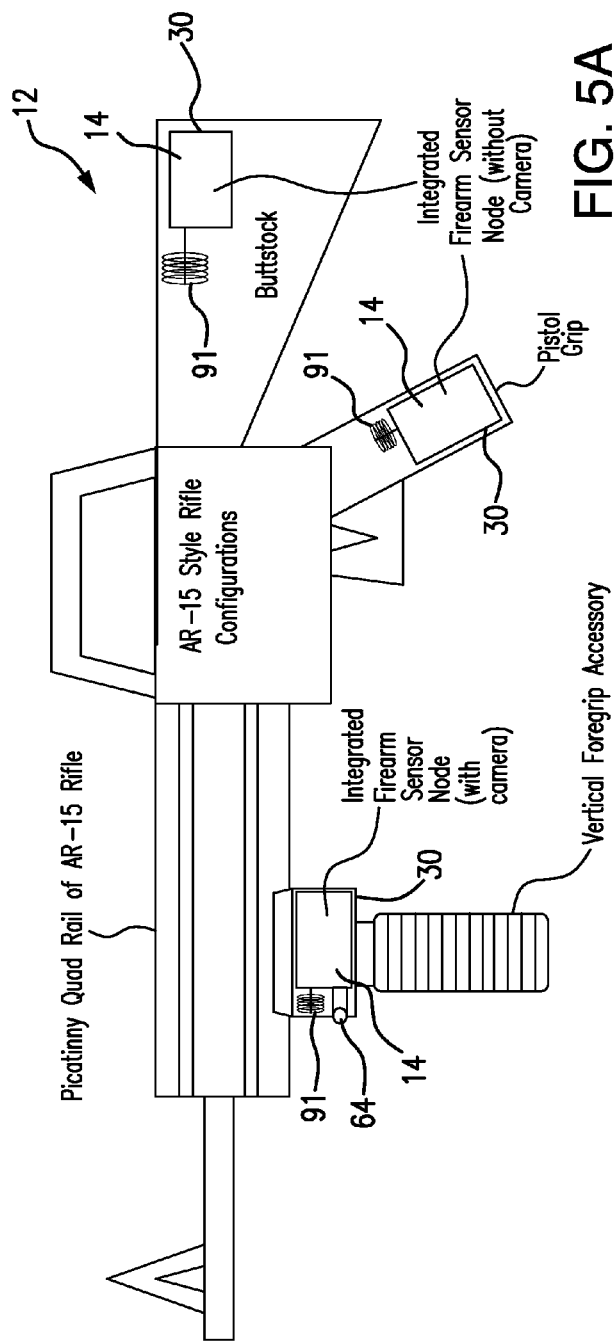
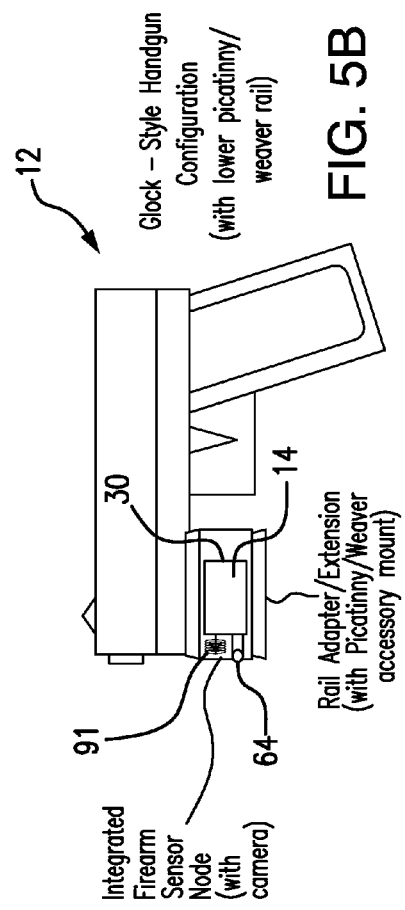

INTERNET OF THINGS (IOT) AUTOMATED INTELLIGENCE MODULE (AIM) AND MANAGEMENT SYSTEM

REFERENCE TO THE RELATED PATENT APPLICATIONS

This Utility Patent Application is based on the Provisional Patent Application No. 62/156,938 filed on 5 May 2015.

FIELD OF THE INVENTION

The present system relates to a firearm critical event alert and response system, and in particular, to a firearms accessory telemetry intelligence and tactical management system intended for providing federal and local law enforcement agencies, as well as private security firms, the military, gun sellers, gun owners, etc., with the unique capability for real-time tracking and monitoring of firearms of interest.

More in particular, the present system is directed to firearm accessories mountable on a firearm and equipped with an Internet of Things (IoT) Automated Intelligence Module (also referred to herein as "AIM", or "sensor module") configured to acquire comprehensive weapons intelligence on the firearm's use, status, location, detection of critical events in the field, and transmitting the data to end-users (designated recipients) via Internet-enabled or wireless communications devices (such as, for example, smart phones, laptops, etc.).

In particular, the present system relates to an IoT sensor module that is mounted onto (or operatively coupled to) a firearm of interest and which is configured to perform a variety of functions essential for a complete real-time, or near real-time, awareness by the end-users (such as, for example, commanders, command centers, dispatch units, squad leader, etc.) of the events taking place in the field in connection with the firearm, and supporting the end-users' ability to immediately respond to critical situations for the enhanced public and personnel safety and operational efficiency.

The subject system is also directed to an IoT sensor module configured to capture and transmit the firearm's location and acquired weapons intelligence data over an IoT wireless network (for example, a Low-Power Wide-Area Network, based on wireless communications platforms such as LoRa™, Haystack, NarrowBand IoT (NB-IoT), LTE for Advanced Machine Type Communications (LTE-MTC), Narrowband Fidelity (NB-Fi), Ultra Narrow Band (UNB), and/or cellular-based network, etc.) to provide real-time, or near real-time, alerts to end-users (via the end-users' application) of ongoing critical events in the field (which may include an event when a firearm is un-holstered, discharged, as well as loss of a firearm's chain of custody, and other emergency situations).

In addition, the present invention is directed to an IoT sensor module, the hardware/software components of which are arranged as a single board computer of one or more layers (or any other arrangement allowing each individual component to act in concert to perform the functionality described herein) which is housed within the sensor module enclosure, which is mountable to a firearm either within a firearm accessory, or directly onto an accessory rail (such as the Picatinny, Weaver, or STANAG rail), or via a component part, such as, for example, a MIL-STD-1913 Picatinny and Weaver rail adapter, or the barrel of the weapon system.

More in particular, the present invention is directed to the IoT sensor module equipped with interrelated hardware components and software (sensor module application) underlying the operational interrelation of the hardware components and the computational aspect of the sensor module for performing a variety of functions which include, but not limited to: (a) detection of an event when the firearm of interest is un-holstered or holstered, (b) capturing video and audio data of the firearm's line of sight when the firearm is in a firing position, (c) recording the directionality (angle/direction of fire) of the firearm at the time of discharge, as well as the number of discharges from the firearm as each event occurs, (d) recording the location of the firearm at the time of each event, including un-holster, holster, and/or discharge, (e) transmitting (via an LPWAN gateway, Bluetooth edge device (such as an iPhone, iPad, Android Phone, or Tablet, etc., and/or a cellular-based network) the information indicating the unique identification, the real-time, or near real-time, location (acquired via the GPS receiver), as well as the directionality of the firearm, to a server hosting a data repository and supported by an end-user's application and accessible via an internet connected personal computer and/or mobile device(s), and (f) displaying alerts indicating the real-time, or near real-time, location of the firearm when un-holstered/holstered and/or discharged, loss of the firearm's chain of custody, the directionality of a firearm, and a breadcrumb trail of the firearm's weapons intelligence data.

The present system is further directed to the IoT sensor module mountable on a firearm of interest and capable of transmitting data to cloud-based servers, a back-end database, and API (Application Program Interface) via an LPWAN gateway, and/or a Bluetooth enabled edge device, and subsequently, from the cloud-based servers to the application, which is operated by end-users.

The present system is also directed to the IoT sensor module which includes an Inertial Measurement Unit (IMU) equipped with an accelerometer encoded to measure acceleration forces applied to the firearm, which are processed for detecting the firearm discharge(s), and a magnetometer for determining a 3-D orientation of the firearm, as well as measuring of the angle of the firearm tilting with respect to the earth when the firearm un-holstering/holstering event and/or a discharge event has been detected.

Furthermore, the present system is directed to the IoT sensor module equipped with an integrated camera sensor and audio recording unit which are programmed, respectively to capture, upon activation, still images at a pre-set frame rate and resolution, and audio signals, which are encoded into a video and synchronized each with the other, as well as with the captured intelligence data, and subsequently are stored on an integrated internal flash memory microchip, or, alternatively, on a Solid-State drive (SSD), for subsequent images/audio retrieval, and transmission to the back-end data repository, and to the end-users' application along with other intelligence data for comprehensive real-time, or near real-time, coverage of a situation in the field or other designated area, as well as for post-event review, for usage as evidence, etc.

BACKGROUND OF THE INVENTION

Monitoring of firearms to improve the public safety, as well as for notifying authorities (such as police departments, or security guard agencies, or the like) of a firearm discharge or other dangerous situations involving firearms over a wireless communication network has been addressed, for example, in U.S. Pat. No. 8,339,257 and U. S. Patent Application Publication No. 2014/0290110.

In the '257 Patent, a firearm is described which is equipped with the capability of wireless communication to report a discharge of the firearm to a reporting center terminal via a wireless communication link. A sensor is coupled to the firearm housing (which encases a trigger assembly) for sensing the discharge of the firearm. The housing encases a wireless communication unit for transmitting messages indicating occurrence of the firearm discharge to the reporting center terminal via a wireless communication network.

A GPS receiver installed in the firearm receives signals from GPS satellites to enable the calculation of the location of the firearm to be transmitted to the reporting center terminal upon detection of the discharge of the firearm.

The sensing circuitry is implemented with an accelerometer to sense movement of the firearm and to detect a discharge, an antenna to receive GPS signals from the satellites and send SMS messages, a battery rechargeable by movement of officers or guards, and SMS components to send location of the handgun and time of the firearm discharge.

Another system for enhancing firearm safety through wireless network monitoring described in U. S. Patent Application Publication No. 2014/0290110, includes a sensing device mounted to a firearm. The sensing device includes a Subscriber Identity Module (SIM) communicating with a server over a signaling channel of a wireless communication network.

The sensing device is configured to enable/disable the firing mechanism in the firearm in accordance with instructions received by the SIM from the server. Movements and/or attempted operations of the firearm may be monitored using an application running on a mobile device, which receives information concerning the firearm over the signaling channel of the wireless communication network.

The sensing device may include its own battery which may be rechargeable. The firearm may be configured with a port to permit coupling to an external power source to facilitate recharging of the integrated battery. The firearm owner may be notified via the mobile application of the battery status.

The sensing device includes one or more integrated circuits, having an on-board microcontroller, random access and redundant memory (which stores an operating system), an electrically erasable programmable read only memory that stores personality information such as a unique identifier, e.g., an international mobile subscriber identity (IMSI), and a related cryptographic key that is used to identify and authenticate a subscriber on a mobile telephone network. The SIM may also store one or more of a unique serial number(s), a personal identification number (PIN), and a personal unblocking code for unlocking the PIN. Applications also may be stored on the SIM, for example, the application which facilitates communications between the SIM and a mobile device.

In operation, the SIM stores network state information, including a location area identity (LAI), which is updated whenever the SIM changes locations.

The SIM communicatively couples the sensor device over a wireless network to a cloud-based platform that includes computer-based decision-making and database of rule sets for signaling information. The cloud-based platform is further communicatively coupled via a wireless network to a mobile device (such as a smart phone), which includes a firearm monitoring and safety application.

The mobile device application enables the firearm owner (or user) to communicate with the sensor device to receive status information such as alerts produced by motion sensors (included in the sensor device) responsive to movements of the firearm. The sensor device may be also enabled for the purposes of tracking the location of the firearm.

Another firearm security system (which is described in U.S. Pat. No. 8,819,979) includes a module incorporating the motion sensor which is interconnected to a gun. The motion sensor generates a motion signal if movement is detected. The motion signal can be passed to a communication device associated with the gun owner through a network.

The security module includes a motion sensor which may be an accelerometer or any other device capable of sensing movement of the firearm to which the security module is interconnected, and is capable of generating a motion signal in response to detection of such movement, such as a motion sensor. Multiple motion sensors of different types and orientation can be included in the security module.

A satellite positioning system receiver may also be included in the security module for generating signals that indicate the location of the security module, and sensing changes in the location of the firearm generating a motion signal in response to detection of the change of the firearm location.

The security module additionally includes a trigger lock assembly which can be electronically and/or mechanically locked or unlocked. When the trigger lock is unlocked (either in response to an electronic command or manually), the trigger lock may generate an unlocked trigger signal. The trigger lock may also generate a trigger "pulled" signal when the trigger lock is in a locked condition and there is an attempt to actuate the trigger.

The controller can send lock and/or unlock commands to the trigger lock. For example, the controller can send a lock command in response to a "motion detected" signal from either the motion sensor or the satellite positioning system receiver. The controller can send either "lock" or "unlock" commands in accordance with the schedule of locking and unlocking times, proximity of the user's communication device, and/or in response to signals received from the user (or other authority), either through an input/output facility which may be included as a part of the security module, or via the communication device or system server. The gun user (or gun owner) may also remotely lock or unlock the gun by accessing the system server using any device connected to the Internet.

When the security module is removed from an object (firearm) to which it is attached, the security module may generate a "module removed" signal.

A controller is incorporated into the security module to control various aspects of its operation. The controller (processor) receives signals generated by the motion sensor, the satellite position system receiver, the security module, and/or the trigger lock to convert the signals to messages, such as a "motion detected" message, a "position" message, an "unlocked trigger" message, a "trigger pulled" message, a "registered user detected" message when a registered user is within the proximity of the security module, a "module removed" message, etc. The controller sends the messages to a transceiver module for transmission to the communication device and/or the system server. The controller can also cause an alarm signal to be output by an input/output facility of the security module in response to a motion signal from the motion sensor or the satellite positioning system receiver, or in response to a "trigger pulled" signal from the trigger lock.

The transmit/receive module supports communication between the security module and other system components (such as a communication device and system server) via the communication network. Examples of a suitable transmit/receive module include an IEEE 802.11 interface (i.e., Wi-Fi interface), a cellular telephony interface, a Global System for Mobile communication (GSM) interface, Bluetooth interface, a wired Ethernet interface, or the like.

The communication network includes any network or combination of networks capable of supporting the transmission of messages and information from the security module to a monitoring device (such as the communication device and/or the system server).

Although having a utility and constituting a definite progress in the firearms safety approach of police departments or security agencies' personnel, there is still a need for more comprehensive intelligence data acquisition and coverage of the situations in which police officers, or security guards at residential or commercial premises, as well as gun owners, are forced to use their firearms.

SUMMARY OF THE INVENTION

It is therefore an object of the present invention to provide an Internet of Things (IoT) Automated Intelligence Module (AIM) and telemetry sensor system (further referred to herein as "AIM", or "sensor module") mountable onto (or operatively coupled to) a firearm of interest and configured with hardware and software components cooperating to provide a comprehensive firearm status coverage and in-field situational awareness by detecting the weapon un-holstering, or holstering, event or a discharge event, and gathering critical real-time weapon's intelligence data, as well as recording video and audio data, upon the firearm un-holstering, holstering, and/or discharge having been detected.

It is another object of the present invention to provide an IoT sensor module which, being installed on a weapon of interest, gathers the weapon intelligence (including immediate detection and/or notification of the un-holstering, or holstering, and/or discharge event, the number of firearm discharges, as well as 3-dimensional orientation, such as heading (or yaw), pitch and roll, of a firearm at the time of discharge, which in combination with video/audio data (captured upon detection of the un-holstering) provide the situational in-field awareness and crucial information that can be used in real-time (or near real-time), for post crime scene analysis, and/or as forensic evidence.

In addition, a further object of the present invention is to provide an IoT sensor module for the collection of data, which is stored on a local (embedded) flash memory, and wirelessly transmitted to an external web-based storage server and API capable of providing end-users, or designated recipients (such as, for example, computer aided dispatch (CAD), commanders, supervisors, superintendents, etc.) with a real-time (or near real-time) status of the firearm via the IoT sensor module (or IoT AIM sensor), assigned user for the weapon system, as well as alert notifications via on-screen pop-ups, text messages, or email alerts indicative of the weapon status changes, or critical events in the field delivered to end-users' devices (such as mobile phones, laptops, or tablets).

It is a further object of the present system to support the operation of an IoT sensor module which includes a module enclosure mountable to a firearm (for example, within firearm accessories, or directly to the accessory rails), and housing hardware components arranged in a single board computer and operatively interconnected by the sensor module's software (application) to acquire and process firearm intelligence and to wirelessly transmit the information to designated recipients' devices. The components embedded in the sensor module enclosure include a video processing unit for processing images recorded by a video recording unit, and an audio processing unit for processing sounds captured by an external microphone which are activated when a firearm un-holstering event has been detected, or a manual button on the device is depressed to implement immediate filming and weapons intelligence gathering.

In one aspect, the present invention is a firearm critical event alert and response system which comprises an IoT sensor module mountable on (or operatively connected to) a firearm of interest. The IoT sensor module includes the sensor module enclosure and hardware/software components, which may be arranged in a single board computer, and enclosed within the sensor module enclosure.

The components of the subject sensor module include an Inertial Measurement Unit (IMU) configured to detect at least one critical event, such as the firearm discharge event, or a number of firearm discharges, ballistic parameters of the firearm at the time of discharge, and to produce at least one critical event detection signal.

A video unit is operatively coupled to the IMU and is activated upon receipt of the critical event signal. The video unit is composed of a video recording unit extending externally of the sensor module enclosure, and a video processing unit operatively coupled to the video recording unit and configured to generate digital video signals from images captured by the video recording unit.

An audio unit is operatively coupled to the IMU and is activated upon receipt of the critical event signal. The audio unit is composed of a microphone extending externally of the sensor module enclosure, and an audio processing unit operatively coupled to the microphone, which is configured to generate digital audio signals corresponding to the sounds captured by the microphone.

A real-time clock (RTC) unit is operatively coupled to the video unit and the audio unit, as well as to the IMU, to provide date- and time-stamps for all intelligence data collected, including video/audio, utilized by the MCU for synchronization of the acquired weapon intelligence data, including the digital video/audio signals, and a critical event detection signal generated based on the intelligence data.

An internal data storage unit (such as, for example, flash memory) is operatively coupled to the IMU, the video and audio units, and the RTC unit to store the synchronized and date- and time-stamped digital video/audio signals, and other intelligence data, as well as the critical event detection signal, with corresponding date and time stamps received therefrom.

A transceiver sub-system is operatively coupled to the internal data storage unit and configured to transmit weapons intelligence data and alert notifications to an external end-user application installed at the end-user's device.

Preferably, the sensor module enclosure is configured for attachment to the firearm of interest through either the coupling to an accessory rail, or within a Picatinny rail mountable firearm accessory, a Weaver rail mountable firearm accessory, or Picatinny/Weaver rail adapter, as well as within the vertical fore grip, pistol grip, the barrel, or the buttstock of the firearm of interest, etc.

The subject system further includes an Internet of Things (IoT) Low-Power Wide-Area Network (LPWAN) gateway, a cellular-based network, cloud-based servers, with the external data repository residing at the cloud-based server(s).

The IoT sensor module's transceiver sub-system includes a LPWAN radio frequency (RF) transceiver, a Bluetooth transceiver, and a Global Positioning System (GPS) receiver coupled to the LPWAN RF transceiver and/or paired to an internet-enabled mobile device via the Bluetooth transceiver. The firearm of interest real-time (or near real-time) location signal received at the GPS receiver is transmitted to the LPWAN transceiver or the Bluetooth transceiver, and is either transmitted to the IoT LPWAN RF gateway or the cellular-based network via the Bluetooth paired internet-enabled mobile device, and the external data depository through the LPWAN or Bluetooth transceivers.

The subject sensor module's components further include a Microcontroller Unit (MCU) operatively coupled to the IMU, the Video Unit, the Audio Unit, the Internal data storage unit, the GPS receiver, as well as the LPWAN and Bluetooth transceivers to coordinate and operatively support operational interrelation therebetween.

The IMU in the firearm sensor module further includes an accelerometer to measure acceleration forces applied to the firearm of interest, as well as dynamic and static acceleration of the firearm of interest. The IMU is configured to process the measured acceleration forces and the dynamic acceleration of the firearm of interest for detecting the firearm discharge(s).

The IMU further includes a magnetometer operatively coupled to the accelerometer. The magnetometer is configured to determine a 3-dimensional (3-D) orientation of the firearm of interest at the event of firearm discharge. The IMU is also configured to analyze a direction of movement and an angle of the firearm tilting at the time of the discharge based on the measured dynamic and static accelerations and the angle of the firearm tilting.

A proximity sensor is included in the single board computer for detection of the critical event(s), including the firearm un-holstering, holstering, or removal of the firearm from a designated storage device or in the event of loss of the firearm's chain of custody.

The internal data storage unit may be represented, for example, by an integrated internal flash memory microchip, a solid state drive (SD), or a Micro-SD flash card.

The IoT sensor module further includes a battery cell, and a Battery Charging Controller integrated in the sensor module enclosure for linear charging of the battery cell.

The IoT sensor module is configured with a logic underlying the routines of:

determining the real-time (or near real-time) location of the firearm of interest when activated by a predetermined condition or manual activation, and recording the directionality of the firearm at the time of discharge;

capturing still images of the firearm's line of sight when the firearm is un-holstered and/or in a firing position;

transmitting information indicating the unique identification, the real-time (or near real-time) location, and the directionality of the firearm of interest directly to the IoT LPWAN Radio Frequency (RF) gateway, or cellular-based network via Bluetooth paired to the sensor module, and to a server hosting the data repository and supported by an end-user's application accessible via an internet connected computer and at least one mobile device; and displaying notifications indicating the real-time (or near real-time) location of the firearm of interest, the precise or approximate location of a firearm of interest when un-holstered, holstered, or discharged, the 3-D directionality of a firearm of interest, and a breadcrumb trail of the firearm of interest's location.

The subject sensor module further includes a pair of momentary switches disposed at the opposite sides of the sensor module enclosure in operative interrelation with the MCU. The momentary switches are symmetrically depressed when the firearm of interest is inside the holster (or other storage device). The momentary switches (or at least one momentary switch) are not depressed (or engaged) when the firearm of interest is un-holstered, removed from a storage device, or there is a loss in the firearm's chain of custody. When the MCU receives a signal from the momentary switches indicating termination of depression (engagement), the MCU makes a decision of a possible un-holstering event.

In order to confirm a possible un-holstering, or holstering event, the subject sensor module is further equipped with a pair of photocell units disposed at the opposite sides of the sensor module enclosure in operative engagement with the MCU. The photocell units are light-controlled variable resistors configured to determine whether the firearm is exposed to light (when un-holstered or removed from a storage device). The photocell units produce output signals which, when deviating from a predetermined threshold value (corresponding to the situation when the firearm is holstered and is not exposed to ambient light), or unbalanced, may be indicative of a possible un-holstering event.

The signal corresponding to the light outputs' unbalance and deviation from the threshold value is coupled to the MCU, and the possible un-holstering event is detected based on combination of at least one momentary switch disengagement and the detection of the light outputs' unbalance and deviation from the predetermined value.

The MCU is configured to perform analytical computations of the photocell unit's outputs, and, if unbalanced outputs have been detected, the MCU performs analytical computations on the magnetometer data to determine presence of a strong magnetic field. If no strong magnetic field is detected in vicinity of the firearm of interest, the MCU declares the un-holstering event, and conversely, when a strong magnetic field is detected in vicinity of the firearm of interest, the MCU declares the holstering event.

In another aspect, the present system is envisioned as a sensor module mountable to a firearm of interest. The sensor module includes:

an enclosure housing a computer board which supports the sensor module's components. The sensor module components include:

a pair of momentary switches positioned at opposite sides of the enclosure, a pair of photocell units disposed at opposite sides of the enclosure, and a magnetometer unit.

The sensor module components further include:

an Inertial Measurements Unit (IMU) composed of an accelerometer measuring dynamical and static accelerations of the firearm, and a magnetometer measuring a 3-dimensional orientation of the firearm of interest.

A Micro-Controller Unit (MCU) is operatively coupled to the momentary switches, photocells, and the IMU. The MCU is configured to process signals received from the momentary switches to determine whether the momentary switches are depressed (or engaged), to process light output of the photocell units to determine whether the light output is balanced, does not deviate from a predetermined threshold value, and to process an output of the magnetometer to determine the presence of a strong magnetic field in order to detect the firearm un-holstering event if at least one of the pair of momentary switches is not depressed, light output of the photocell units are un-balanced, and a magnetic field is absent in the vicinity of the firearm of interest.

The MCU is further configured to process the accelerometer measurements of the IMU to determine the firearm discharge(s) based upon the measured dynamic acceleration, and to determine an angle of the firearm tilting in the event(s) of discharge based on the acceleration compensated magnetometer readings.

The sensor module further includes a video unit composed of a video recording unit extending externally of the enclosure, and a video processing unit operatively coupled to the video recording unit, and configured to generate digital video signals from images captured by the video recording unit.

An audio unit is also included in the subject firearm sensor module. The audio unit is composed of a microphone extending external the enclosure, and an audio processing unit operatively coupled to the microphone, and configured to generate digital audio signals from the sounds captured by the microphone in sync with the video recording.

A real-time clock (RTC) unit is operatively coupled to the video unit, the audio unit, and the IMU to assist in synchronization of the digital video/audio signals, and the discharge detection signal from the IMU, as well as the results of processing the weapon intelligence data collected by the sensor module.

An internal data storage unit (operatively coupled to the IMU, the video and audio units, and the RTC unit) records synchronized digital video and audio signals and the critical event detection signals. The RTC unit timestamps the collected weapon's intelligence data (including video/audio). The data is subsequently synchronized by the MCU and stored onto the data storage unit.

The subject sensor module further includes an LPWAN transceiver, a Bluetooth transceiver, and a Global Positioning System (GPS) receiver coupled to the LPWAN RF transceiver and paired to an external internet-enabled mobile device via the Bluetooth transceiver. The firearm of interest real-time location signal received at the GPS receiver, is coupled to the LPWAN transceiver, and transmitted to an external IoT LPWAN RF gateway, or a cellular-based network via Bluetooth paired to an internet-enabled mobile device(s), and an external data depository through the LPWAN and Bluetooth transceivers.

The sensor module is configured with a logic underlying the routines of:

determining the real-time location of the firearm of interest when activated by a predetermined condition, or manual activation, recording the directionality of the firearm at the time of discharge;

capturing still images of the firearm's line of sight when the firearm is in the firing position;

transmitting information indicating the unique identification, the real-time location, and the directionality of the firearm of interest directly to the LPWAN gateway, the cellular-based network, and to the server hosting the data repository supported by an end user application accessible via an internet connected personal computer and at least one mobile device; and displaying at least one alert and at least one notification indicating the real-time location of the firearm of interest, the precise location of a firearm of interest when unholstered or discharged, the directionality of a firearm of interest, and a breadcrumb trail of the firearm of interest location.

These and other objects of the present invention will become clearer from a further detailed description of the present invention taken in conjunction with the accompanying Patent Drawings presented in this Patent Application.

BRIEF DESCRIPTION OF THE DRAWINGS

FIG. 4A and FIG. 4B are the schematic representation of alternative installations of the subject IoT sensor module within the vertical-style foregrip accessory (FIG. 4A) and within the Picatinny and/or Weaver rail mount (FIG. 4B);

FIG. 5A illustrates alternative embodiments of the installation of the subject firearm IoT sensor module within the vertical-style foregrip onto the rail interface system (RIS) with the Picatinny Quad rail, as well within the pistol grip, and the buttstock, of an AR-15 rifle;

FIG. 5B is representative of another embodiment of installation of the subject firearm sensor module (with camera) at the rail mount adapter/extension with Picatinny/Weaver accessory mount attached to the lower receiver rail of the Glock-style handgun configuration;

DETAILED DESCRIPTION OF THE PREFERRED EMBODIMENT

Figure 1:
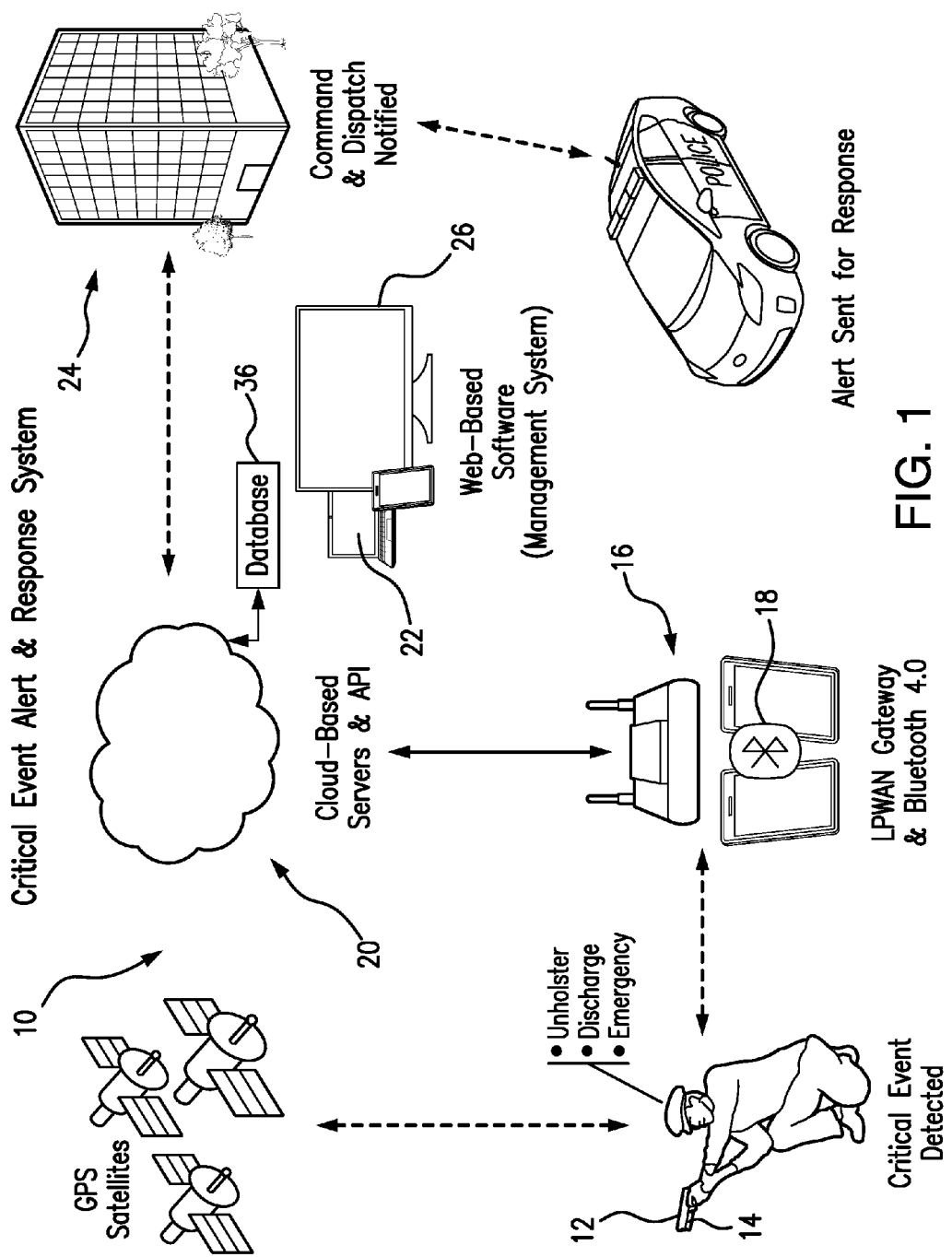
FIG. 1 is a representation of the subject system in the environment of a critical event alert and response.
Figure 2:
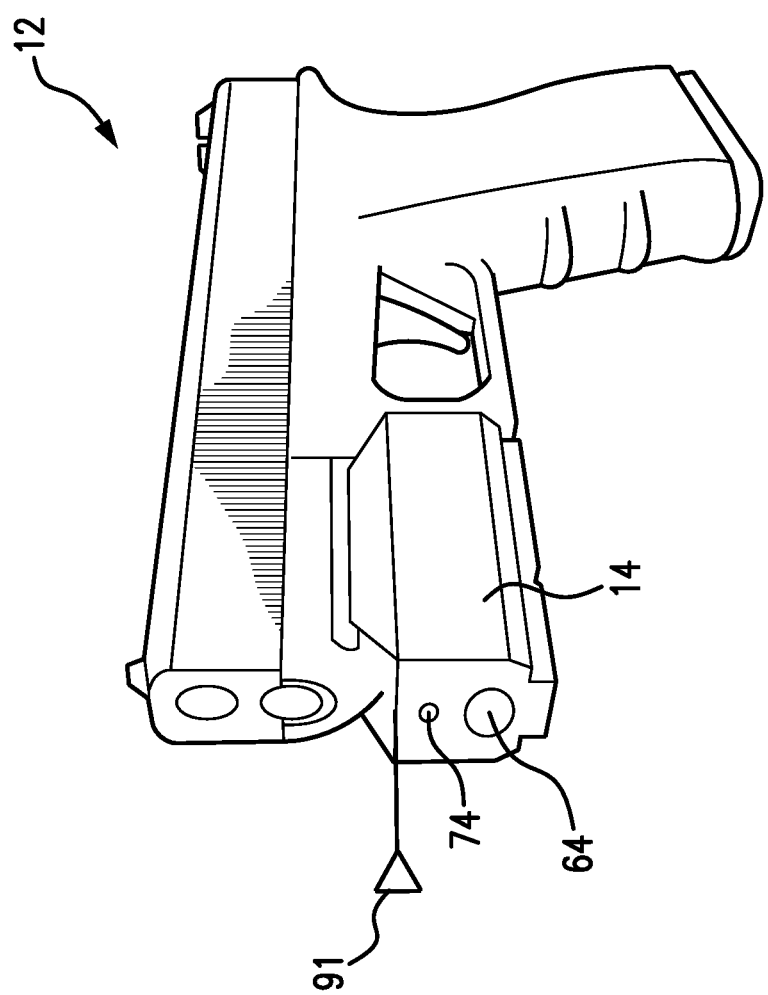
FIG. 2 is a perspective view of a firearm with the installed IoT sensor module of the present invention.

The subject Internet-of-Things (IoT) Automated Intelligence Module (AIM) and management system (also referred to herein as IoT AIM and telemetry sensor system) 10, shown in FIG. 1, has been designed with the primary purpose of providing end-users, also referred to herein as designated recipients, such as, for example, law enforcement, private security and military commanders and personnel, with a high-level of shared situational awareness, delivered with the speed, accuracy, and timeliness necessary to operate at their highest potential and to conduct successful operations in a highly efficient manner The actionable intelligence data collected and captured by the AIM via the IoT communications link (for example, LPWAN or Bluetooth paired to an internet-enabled mobile device) is stored on a web-based storage server(s) and API (Application Program Interface) capable of providing an end-user with a near real-time status of the module, assigned user and weapons system, as well as notifications (via on-screen pop-ups, text messages, or email alerts) to designated recipients (e.g., computer aided dispatch, commanders, supervisors, superintendents, etc.) of any status changes or critical events in the field, such as situations including the weapon un-holstering and/or removal from a storage device, and/or when a weapon is discharged.

The actionable intelligence data collected and recorded by the subject IoT AIM and telemetry sensor system 10 can be used for numerous purposes including, but not limited to:

developing situational awareness and intelligence with a joint mindset operating across all levels of the operation(s), and supporting a commander in the decision making and directing process, and using assets (i.e., personnel, vehicles and weapon systems);

providing the capability to form modular forces capable of independent action, empowered by an information network that can be quickly accessed, tailored and aligned to support any situation or operation;

providing accountability and enhanced transparency of operations and personnel deployed in the field by means of collecting critical event data when a weapon 12 is discharged. The video/audio recorded and data collected can be used for post-event analysis, review and training.

The system 10 includes an IoT Automated Intelligence Module 14 which may be also referred to herein as IoT sensor module, or (AIM) sensor, as well as a wireless Low-Power-Wide-Area Network (LPWAN) and Bluetooth module and tactical asset monitoring system.

Another use envisioned for the subject system 10 resides within the outdoor sports industry. Because of the AIM's small size and unique functionality, it can be mounted on to a Picatinny or Weaver style accessory rail, or embedded within many types of weapons (including, but not limited to, crossbows, recurve bow, paintball guns, airsoft guns, cannon, small artillery, shotguns, pistols, muskets and other rifles, etc.) used for outdoor or recreational sporting activities, such as hunting, skeet shooting, paintball, airsoft, nerf sports, firearms training, marksmanship competitions, etc.

Referring to FIGS. 1, 2, 4A-4B, 5A-5B, and 6-8, a firearm of interest 12 is provided with the IoT sensor module 14 and is designed with a capability to record video data, capture audio data, and collect actionable intelligence data to communicate via an IoT wireless network, which may be a Low-Power Wide Area Network (LPWAN) 16, as well as Bluetooth or other wireless communications Link to an internet-enabled mobile device 18, and cloud-based servers (and API) 20, to an end-user application 22 (which may be the web-based software) installed on computers and/or web-supported devices 26 of end-users 24, and configured to retrieve and process the intelligence data collected by the AIM sensor 14, and to display alert notification(s) for the end-users 24 to respond.

Returning to FIG. 1, which depicts a high-level overview of the situation when a critical event (i.e., the firearm un-holstering, discharge, or emergency activation, etc.) is detected, the firearm sensor node 14 captures geolocation coordinates of the node (as well as of the firearm 12 it is mounted on) and transmits the firearm status and changes in status (i.e., critical events, if any) through the LPWAN Gateway (router) 16, and/or via Bluetooth (or other wireless communications) link 18, when paired to the internet-enabled device (edge device) 26, such as, for example, a mobile phone, tablet, or PC that has a steady internet (edge) connection, and runs the mobile application installed thereon.

The AIM sensor 14 synchronizes with the mobile application which subsequently relays data (i.e., geolocation coordinates and the firearm status) to the Cloud-based servers and Application Program Interface (API) 20. Subsequently, the data is displayed on an end-user web-based application 22, or on the edge enabled device 26 which has the mobile application installed. Once the critical event alert is received by command or dispatch, also referred to herein as end-users or designated recipients 24, they can strategize and send a unit to respond to the situation in the field.

The Internet of Things (IoT) is the network of physical objects (devices, vehicles, buildings and other items) embedded with electronics, software, sensors, and network connectivity that enables these objects to collect and exchange data. The IoT allows objects to be sensed and controlled remotely across existing network infrastructure, creating opportunities for more direct integration of the physical world into computer-based systems, which results in improved efficiency, accuracy, and economic benefit. Each Thing is uniquely identifiable through its embedded computing system but is able to interoperate within the existing Internet infrastructure. The AIM 14 is considered herein as an object (or a Thing) of the IoT.

The data collected from the IoT AIM 14 is processed and displayed on the end-user's 24 application desktop, mobile, and/or web-based interface. Data specifically collected from the IoT node 14 includes a unique identification of the module 14, the weapon's current status, such as whether the weapon is holstered or un-holstered, or stored within a storage container, a geolocation of the weapon 12 when the activation and/or deployment is detected. The data also includes the ballistic information (i.e., angular positioning of the firearm and the trajectory of the bullet) when the weapon is discharged.

The firearm IoT sensor module 14 is provided with the capability to record video, capture audio and collect actionable intelligence data. The captured video/audio signals, as a part of the collected intelligence data, are stored directly onto the firearm sensor module 14, specifically, on a flash memory storage card 28 embedded in the module 14.

The acquired intelligence data is also communicated over an IoT Low-Power Wide-Area Network 16 and/or via Bluetooth or other wireless communications link 18 to the edge devices 26, i.e., tablet, laptop, smart phone, or wearable device, such as a smart watch or google-style glasses, etc.

LPWAN is a type of a wireless telecommunication network designed to allow long range communication at a low bit rate among things (connected objects), such as sensors operated on a battery. LPWAN uses numerous platforms, such as Haystack, LoRa™WAN, NB-IOT, NB-Fi Protocol, etc.

For example, the LoRa™WAN is a Low Power Wide Area Network (LPWAN) specification is a media access control (MAD) layer protocol intended for wireless battery operated Things and designed for large-scale public networks with a single operator. It is built using Semtech's LoRa™ modulation scheme. It is fit for public, wide-area networks, because with LoRa™WAN, all the channels are tuned to the same frequencies.

LoRa™WAN has three classes that are applicable in the subject system. Class A is purely asynchronous, meaning that the end nodes do not wait for a particular time to "speak" to the gateway. They transmit whenever they need to and lie dormant until then. As soon as one node completes its transmission, another node starts immediately.

Class B allows for messages to be sent down to battery-powered nodes. Every 128 seconds, the gateway transmits a beacon. All LoRa™WAN base stations transmit beacon messages at the same time, as they are slave to one pulse-per-second (1 PPS). This means that every GPS satellite in orbit transmits a message at the beginning of every second, allowing time for synchronization around the world. All Class B nodes are assigned a time slot within the 128 second cycle and are told when to listen.

Class C allows nodes to listen constantly, and a downlink message can be sent any time. This is used primarily for AC-powered applications, since it takes a large amount of energy to keep a node actively awake running the receiver at all times.

Referring to FIGS. 2, 3, 4A-4B, 5A-5B, and 6-8, the IoT AIM 14 is built with an enclosure 30 which houses the components 32 of the node 14 which are operationally interconnected to provide the node's intended functionality and may be, for example, arranged as a single board computer 34. The enclosure 30 of the node 14 may be affixed to or embedded within a firearm's accessory attachment such as, for example, a hand-guard, rifle stock, vertical grip, etc., as well as it may be embedded within the receiver of a firearm or weapon (which for this purpose may need modification in a shape of a reception) for receiving and securing the enclosure 30 therein.

Alternatively, the enclosure 30 may be configured with external structural elements which may be compatible with the accessory rails, or the barrel of a weapon system. The AIM sensor 14 may also be affixed to an accessory's part, such as, for example, a Picatinny/Weaver/STANAG rail adaptor.

The accessory rail may be the Picatinny rail, Waver rail, or STANAG rail. The Picatinny rail, also known as MIL-STD-1913 rail, Standardization Agreement 2324 rail, or tactical rail, is a bracket on firearms that provides a standard mounting platform consisting of rails with multiple transverse slots similar in concept to the commercial Weaver rail mount used to mount telescopic sights on firearms. The Picatinny rail design consists of a precision crafted strip undercut to form a flattened T cross-section provided with crosswise slots at intervals interspersed with slots that allow accessories to be slid into place from the end of the rail and then locked in place, or slid into the slots between the raised slats, then moved a short distance back or forth or clamped to the rail with bolts, screws or like devices.

The NATO Accessory Rail (or NAR), defined with the new modernization agreement 4694, is a standard for mounting auxiliary equipment such as telescopic sights, tactical lights, laser aiming modules, night vision devices, reflex sights, foregrips, bipods and bayonets to small arms, such as rifles and pistols. STANAG 4694 was approved by the NATO Army Armaments Group and Land Capability Group 1 Dismounted Soldier. The NATO Accessory Rail is backwards-compatible with STANAG 2324 or MIL-STD 1913 Picatinny rail.

Another accessory rail, i.e., the Weaver accessory rail, is based on a low wide dovetail, while the Picatinny variation has a more pronounced angular section. The significant difference between the Picatinny rail and the similar Weaver rail are the size of the slots and the fact that they are standardized.

Designed to mount heavy sights of various kinds, a great variety of accessories and attachments are now available, and the rails are easier fitted or machine milled into the upper, side and lower surface of all manner of weapons (from crossbows via pistols and long arms up to and including anti-materiel rifles). Accessories (which may include vertical "tool" or "pistol" grips, bipods and rests, etc.) can be mounted by sliding into place or clamped to the accessory rail. The subject AIM sensor 14 is envisioned to be compatible with the firearms accessories and attachments, accessory rails, and accessory adapters/extensions, etc., available in the industry, and yet to be developed.

The components 32 may be embodied in the enclosure 30 that can be mounted directly onto a Picatinny rail or embedded within a firearm accessory. For example, as shown in FIG. 4A, the Picatinny/Weaver rail vertical foregrip accessory which houses the AIM sensor 14 is mounted to the Picatinny rail mount. Alternatively, the Picatinny/Weaver rail (extension) adaptor between the accessory and the rail mount houses the AIM sensor 14 which permits mounting of the standard firearm accessory to the accessory Picatinny mount in the subject machine gun 12.

Alternative installations of the AIM sensor 14 within the standard firearm accessories mounted to Picatinny rail mounts of the AR-15 rifle are shown in FIG. 5A. The AIM sensor 14 (with the camera functionality) can be installed (integrated) in the vertical foregrip accessory of the rifle 12. The AIM sensor 14 (without the camera capability) can also be installed either in the pistol grip or in the buttstock of the AR-15 style rifle configuration.

Referring to FIG. 5B, the rail mount adapter/extension is attached to the lower receiver rail of the Glock-style handgun 12. The AIM sensor 14 (with the camera capability) can be integrated within the rail adapter/extension.

In overall concept, the housing 30 of the AIM sensor 14 is configured to be secured within an accessory that can be fixed to and/or mounted to the weapon system by mounting on the accessory rails. Accessories can include, but are not limited to, enclosures containing Picatinny or Weaver style rail mount for firearms, crossbows, stun guns, as well as barrel style mounting rings, hand guards, vertical foregrips, etc.

Figure 3:
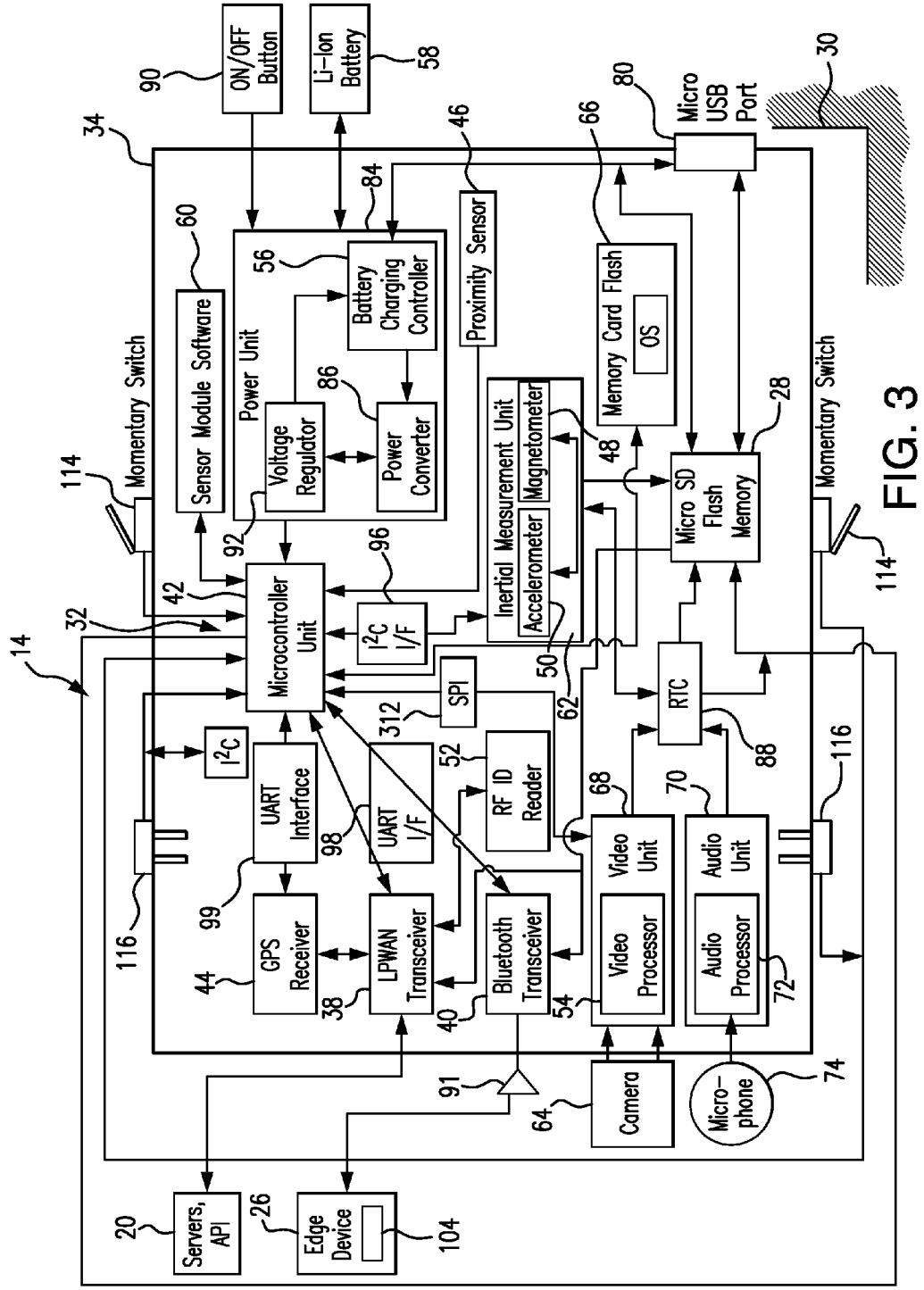
FIG. 3 is a schematic representation of the hardware components and an exemplary board layout of the subject firearm intelligence and telemetry sensor module.

Referring to FIG. 3, the subject IoT AIM sensor 14 is configured to perform a variety of operations comprising:

(a) detection and notification of the firearm un-holstering, holstering, or removal from a storage, as well as storing, (b) capturing video and audio of the firearm's line of sight when the firearm is in a firing position, (c) recording the directionality (angle/direction of fire) of the firearm at the time of discharge, (d) recording the location of the device at the time of discharge, (e) transmitting the information indicating the unique identification of the AIM sensor, the real time location of the device, and the directionality of the firearm. The information is transmitted from the AIM sensor 14 through the low radio frequency RF gateway 16, Bluetooth edge device (iPhone, Android, tablet, etc.) 26, and/or a cellular-based network 18, to the cloud-based server 20 hosting a data depository 36 and supported by the end user application 22 accessible via the Internet-connected personal computer and/or mobile device(s), (f) displaying one or more alerts and/or notifications indicating the real time location of the firearm, the precise location of the firearm when un-holstered and/or discharged, the directionality of the firearm, and a breadcrumb trail of a firearm's location, and other functions contributing into overall intended efficiency of the situational awareness and response to critical events.

In order to support such an extended functionality, the AIM sensor 14 includes a number of interrelated components 32.

In FIG. 3, illustrating an exemplary board layout, the components 32 are arranged in a single board computer (SBC) 34 which is secured within the sensor module enclosure 30 with a battery and camera lens connected to the SBC via ribbon cable. Alternatively, the battery and camera lens may be embedded on the SBC.

The components 32 include, but are not limited to, an LPWAN transceiver 38, a Bluetooth and/or Bluetooth Low Energy (BLE) wireless transceiver 40, a Micro-Controller Unit (MCU) 42, a Global Positioning System (GPS) receiver 44, a Proximity Sensor 46, a gyroscope 48, an accelerometer 50, a Radio Frequency Identification (RFID) Reader 52, Charge-Coupled Devices (CCD) or Complimentary Metal-Oxide Semiconductor (CMOS) camera sensor 54, a Micro USB battery charging module 56, and Li-Ion battery 58. The subject AIM sensor 14 is envisioned to be comparable with different LPWAN RF transceivers, such as, for example, LoRa™ or LoRa™WAN, Haystack, NB-IoT, LTE-MIC, NB-Fi, RPMA, etc.

The Bluetooth transceiver 40, such as, for example, a Smart Bluetooth (Bluetooth 4.0) transceiver is envisioned as operating in three nodes, including Bluetooth, Bluetooth Low-Energy (BLE), and Bluetooth Beacon.

The GPS receiver 44 is coupled to the LPWAN transceiver 38 and/or paired to an internet-enabled mobile device 26 via the Bluetooth wireless transceiver 40.

The AIM sensor's intelligence data is transmitted from the Internet based mobile device 26 to the cloud-based servers and API 20, as well as to a back-end database 36 via the LPWAN and/or Bluetooth/BLE transceivers 38, 40.

Figure 8:
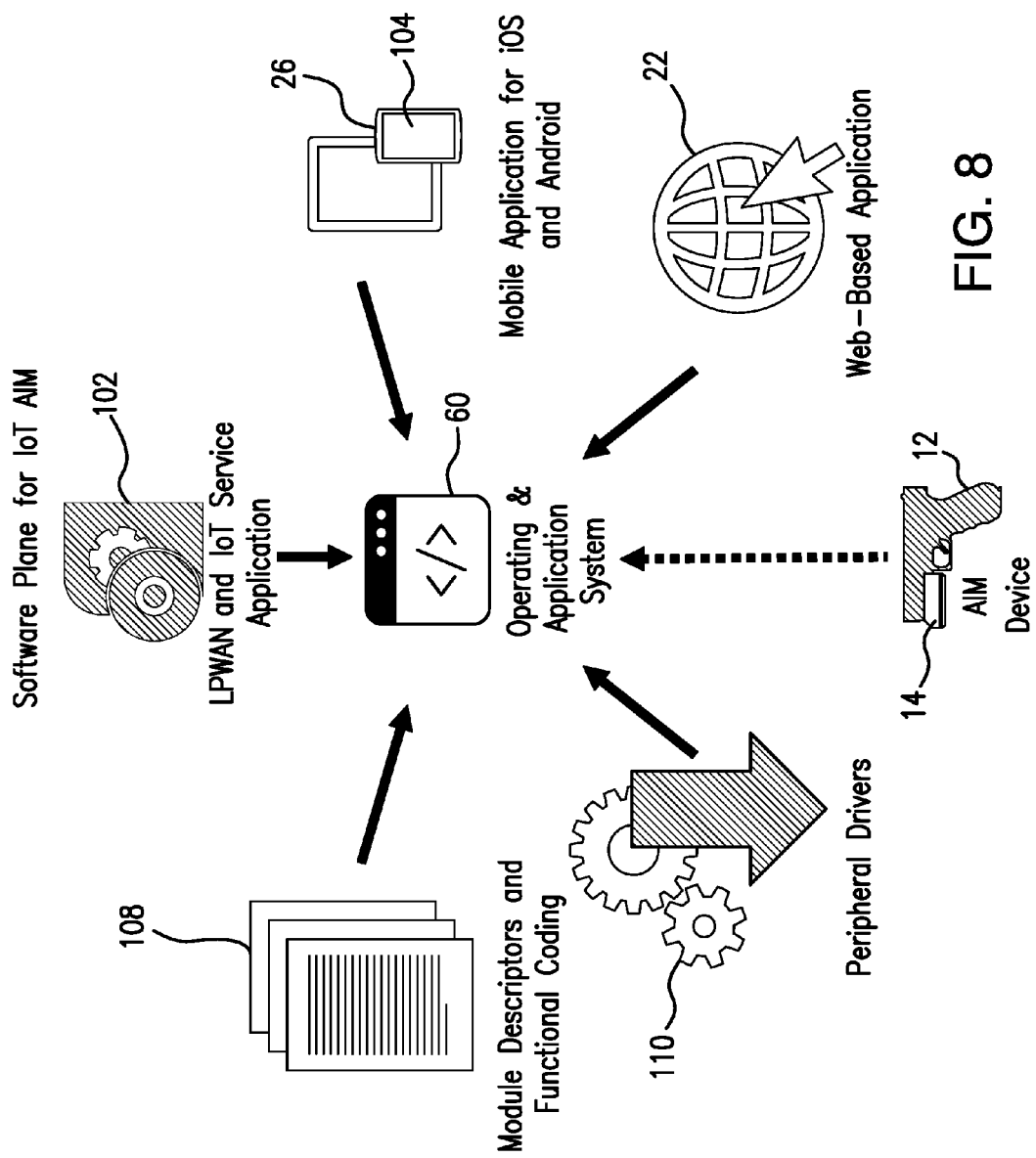
FIG. 8 is representative of the high level software plane of the subject firearm sensor module system.

As shown in FIG. 8, the recorded data is maintained in the external database repository 36, and can be transmitted to the firearm sensor's system application 22 installed at the end-user devices 24, which communicates with the subject sensor module's web-based software 60 which supports the subject system operation.

The web-based software 60 and end-users' application 22 cooperate to support the operation of the management system which is operated by end-users 24 (e.g., on mobile (edge) devices 26) through the mobile application 104 or on a computer through a web-based application 22 to display data and notification to the designed recipients (end-users) 24. The recorded data is maintained on the data repository such as the cloud-based database 36, or at the computers of designated recipients 24.

As shown in FIG. 3, a camera (video recording unit) 64 and a video processing unit (CMOS/CCD) 54 constitute a video unit 68. The AIM sensor 14 is further equipped with an audio unit 70 which includes an audio processing unit 72 and an external microphone 74.

The AIM sensor 14 is further provided with an Inertial Measuring Unit (IMU) 62 which is designed with a three axis accelerometer 50 and the three axis magnetometer 48.

A Micro Universal Serial Bus (USB) port 80 is provided in the sensor node 14.

A power unit 84 is configured to provide power to the components and sensors in the AIM sensor 14. Specifically, the power unit 84 regulates and distributes power to each individual component/sensor, as well as converting the electrical current for charging the lithium-ion battery 58 via the USB port 80. The power unit 84 includes a battery charging unit 56, a power converter 86, the rechargeable lithium-ion battery 58, and the voltage regulator 92.

A battery charging controller 56 (which may be represented by a 5V Micro USB 1A Li-ion battery charging controller) is integrated into the AIM sensor 14 for linear charging of the internal Li-ion battery cell 58.

The embedded transflash memory storage device 28 provides the data storage capability for the digital video/audio data and the weapon's intelligence data gathered by the Inertial Measurement Unit (IMU) 62.

The IMU 62 is configured, through operation of its sensors and components, to detect when the firearm is discharged, the number of firearm discharges, as well as the heading, pitch and roll of the firearm at the time of the discharge.

The accelerometer 50 in the AIM sensor 14 is encoded to measure acceleration forces experienced by the firearm 12. The measurement of the acceleration forces is used for detecting the firearm discharge event(s). The measurements of the magnetometer 48 are used for determining the 3-D orientation of the firearm 12 at the moment of discharge.

The accelerometer 50 senses the amount of dynamic acceleration of the firearm to detect the firearm discharge, and to analyze the direction of the firearm motion. In addition, the accelerometer 50 is configured to measure the amount of static acceleration due to gravity, and, in combination with the gyroscope 48, to determine the angle the firearm 12 is tilted with respect to the ground.

A proximity sensor 46 is included in the sensor module 14 to detect a nominal range of the firearm displacement from the holster (or a storage device) for determining whether the firearm 12 has been being un-holstered/holstered and/or removed from (or stored in) the storage device, such as a gun locker or a rack.

The firearm sensor module 14 is provided with the camera 64 (extending outside the enclosure 30), the output of which is coupled to the CCD camera sensor 54 which is programmed to digitize the still images received from the camera 64 at a pre-set frame rate and resolution. The digitized still images are stored at the integrated internal flash memory microchip 28, which also may be a Solid-State Drive (SSD). An additional flash memory card 66 may be provided on the board 34 of the AIM sensor 14 for example, for storing the Operating and Application software 60.

For example, the IoT sensor module 14 may be provided with the 1 GB DDR2 DS RAM and 2 GB NAND Flash Memory 66 both used for running the Operating System (OS) 60. The internal data storage 28, for example, Micro SD Card slot (MicroSD cards with the capacity up to 64 GB) may be used for storing the collected data (i.e., Video/Audio and critical event data log, including firearm ballistics, time/date stamp, geolocation, etc.).

The internal micro SD slot 28 and memory 66 reside within the enclosure body 30 on the single board computer 34 and may be accessible by removing a protective plate on the enclosure body 30. If the node 14 loses edge (Internet) connection (such as, for example, in a no network service area or a deadspot), it still can detect and capture Video/Audio and other critical event data, and can transmit the data when reconnected to an edge connection, or the data can be accessed via a USB connection 80.

The video unit 68 and the audio unit 70 (as well as other components and sensors configured for acquiring and processing intelligence data, such as the IMU 62 (including the accelerometer 50 and the magnetometer 48), the Proximity Sensor 46, Photocell units 116, Momentary Switches 114, etc.) may be activated when a possible critical event has been detected, such as the firearm with the installed sensor module 14 has been un-holstered, or by depressing a manual button 90 on the housing 30 to implement the immediate filming and weapon's intelligence gathering.

The video unit 68, and specifically, the video processing unit (VPU) 54, is configured to convert the external video images acquired by the camera 64 into electronic signals followed by conversion of the electronic signals to digital video data that can be stored onto the local flash memory storage device 28, and subsequently transmitted via wireless communication channel (or cord) to an edge device 26, cloud-based servers 20, or the external storage location 36.

The audio unit 70, and specifically the audio processing unit 72, is configured to convert the external sounds acquired by the externally located microphone 74 to electronic audio signals, and subsequently to digital audio data that are synchronized with the digital video data and stored onto the local flash memory storage device 28. The synchronized digital audio data with digital video data are transmitted via the wireless link (or via the cord) to an external device 26 or to the database storage 36.

The AIM sensor 14 is also provided with a real-time clock (RTC) unit 88 operating to date- and time-stamp all collected intelligence data, including the video/audio data, to assist in synchronization of the collected intelligence data with the digital video/audio data. The synchronized data is stored in the flash memory storage device 28 to be transmitted to the external edge device 26 and/or the external database 36 location.

The RTC unit 88 is a computer clock that keeps track of the current time and timestamps of the digital data, including video/audio data and weapons intelligence, collected from the components of the AIM sensor 14.

The USB port 80 is configured to program, charge/power of the module 14, and download the digital video/audio data and weapon's intelligence data to a personal computing facility or mobile device(s), or external storage location 36. The USB 80 is externally accessible via the body enclosure 30 for programming, charging and data collection/transfer.

The Bluetooth transceiver 40 is configured to wirelessly pair the AIM sensor 14 with an edge device 26 (i.e., mobile device, PC, or tablet) in order to transmit the captured digital video/audio data along with the weapon's intelligence data to a mobile or desktop application, and/or database for real-time monitoring.

The present IoT system 10 provides federal and local law enforcement agencies, private security firms, and the military with the unique capability to track and monitor their organization's firearms in real-time via internet enabled edge devices (such as smart phones, tablets, netbooks or laptops). The AIM sensor 14 captures and transmits a firearm's location and associated data over the LPWAN RF network 16 or cellular-based network 18 to provide instant alerts to commanders and command centers (end users) of on-going critical events in the field via an end-user application 22.

Critical events may include (but are not limited to) an event when the firearm is un-holstered and/or discharged, as well as the loss of a firearm's chain of custody, and the like. The AIM sensor 14 is capable of capturing still images of the firearm's line of sight, determining the angle of the firearm when discharged, and creating a breadcrumb trail of a firearm's location including associated critical events. Thus, the present system provides the organizations with the ability to immediately respond and support personnel in the enhancing operational efficiency and public safety.

Figure 6:
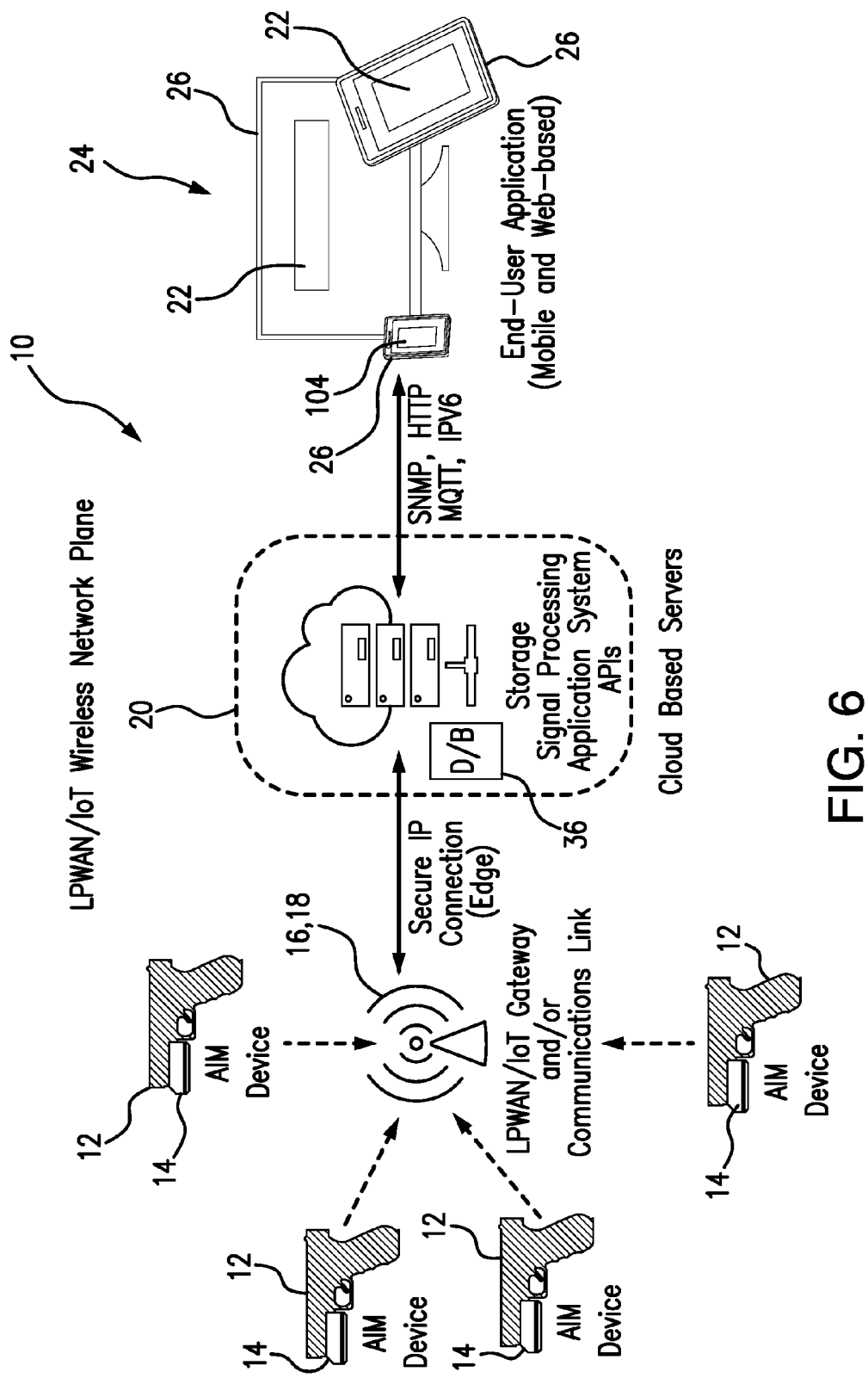
FIG. 6 is representative of the IoT LPWAN wireless network plane of the subject system.

Referring to FIG. 6, a number of firearms equipped with the sensor nodes 14 are connected to either an IoT LPWAN Gateway (LoRa, ISM, Bluetooth, WiFi, etc., which are considered an Internet-of-Things (IoT) communications protocol), or communications link(s), which are paired to the edge enabled device 26 using Bluetooth, WiFi, etc.

The data sent (using the antenna 91) over the secure Internet protocol, such as the IoT LPWAN Gateway 16, or the Communications Link 18, such as the Bluetooth, etc., to the cloud-based servers 20, is aggregated and stored in the database 36 and then processed over the APIs 20 and sent to a web-based end-user application 22 over the secure IP (via any of a variety of protocols, including Simple Network Management Protocol (SNMP), Hypertext Transfer Protocol (HTTP), MQ Telemetry Transport (MQTT), Internet Protocol version 6 (IPv6), or these protocols in combination). The data is subsequently displayed and managed by the end-user application (web-based and mobile applications) 22.

Figure 7:
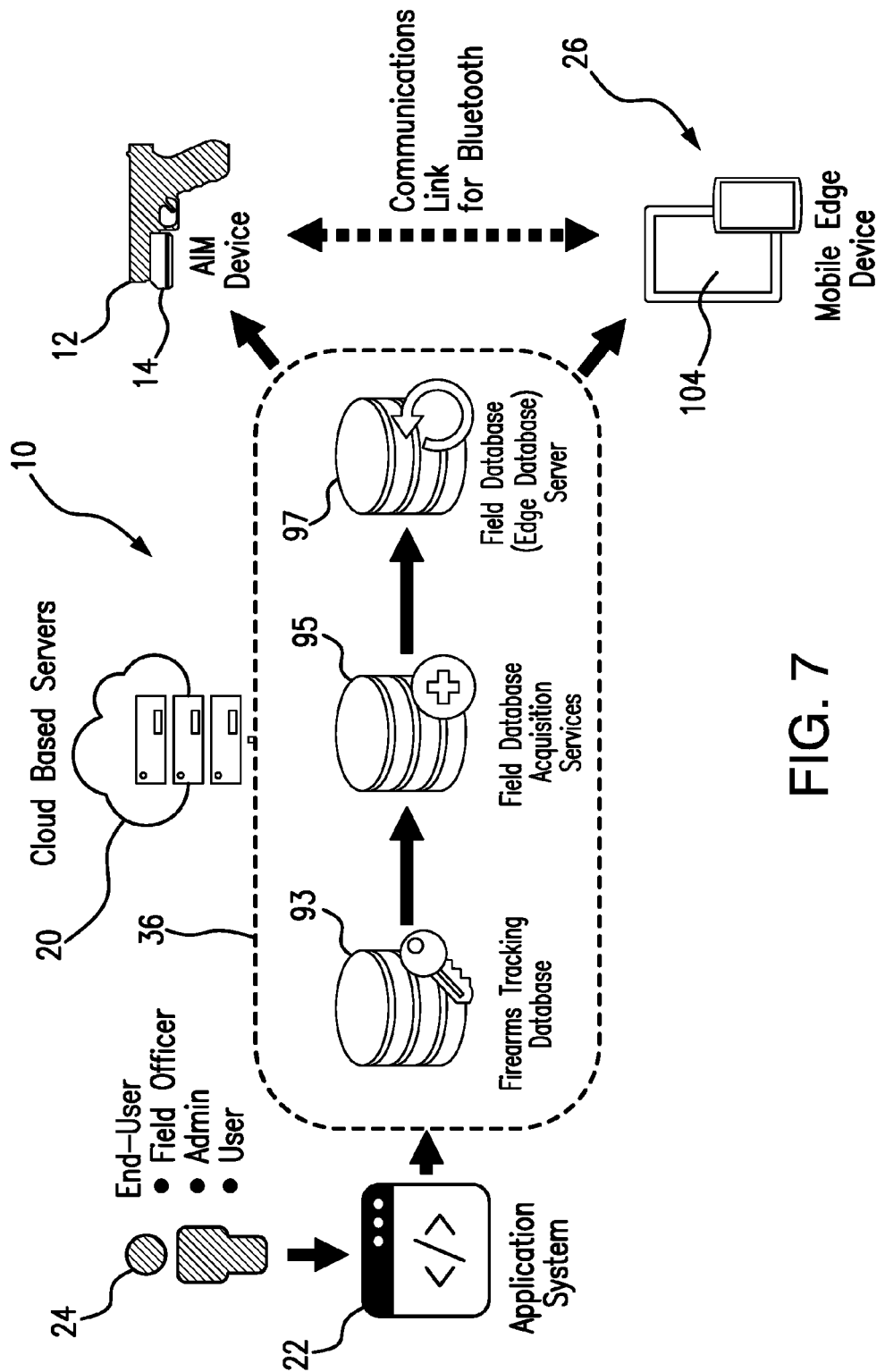
FIG. 7 is representative of the process of accessing the intelligence data collected by the subject firearm sensor module by an end-user via cloud-based servers.

Referring to FIG. 7, which is representative of the system operation in the response regime, the end users 24 (which are field officers, administrators and other designated recipients of the intelligence and video/audio digital signals) use the end-user application 22 to access the database 36 which may include Firearms Tracking Database 93 supported by the Field Database Acquisition Services 95 and the Field Database (edge database) server 97 to communicate with the node 14 of the firearm 12 and also to communicate with the mobile edge device 26 which is operatively coupled to the node 14 through the communication link, such as, Bluetooth.

Specifically, the end-user 24 accesses the application 22 which pulls/stores data from the cloud-based servers 20 which is collected from the sensor module 14 directly (i.e., transmitted using the LPWAN Gateway 16 or any other IoT communication link (such as, for example, Haystack, IEEE 802.11ah, LoRaWAN, RPMA, NB-Fi, UNB, NB-IoT, LTE MTC, etc.) 18, and/or from the edge enabled device 26, which has the application 104 installed, and also provides for the edge device 26 to be paired to the AIM sensor 14 via a communications Link (such as, for example, Bluetooth, WiFi, etc.).

The Firearms Tracking DB 93, Acquisition Services 95, and the field database 97 constitute the part of the database 36 and, in combination, are the back-end part of the complete subject system and software application. The Tracking database 93 stores all the data transmitted from the AIM sensor 14. The Acquisition Services 95 aggregates the AIM sensor's data and synchronizes it with the Filed DB 97 which stores the user input and associates devices with the assigned AIM end-users 24.

Referring to FIG. 8, which is representative of the high-level software plane for the AIM sensor 14, the IoT system 10 is configured with a specific operating and application system 60 which communicates with and uses LPWAN and IoT service application 102, as well as mobile application for IOS and Android 104, Web-Based application 22 and module descriptors and functional coding 108 to process the intelligence data and video/audio digital information received from the node 14. The operating and application system 60 also uses peripheral drivers 110 to execute the software underlying the operation of the subject system.

Specifically, as shown in FIG. 8, the AIM device's on-board operating system (OS) 60 and application is comprised of:

(a) peripheral drivers 110 for the OS 60 supporting components and sensors on the SBC 34 of the sensor module 14;

(b) the AIM device's OS 60 communicating with the web-based application 22 at the end-user's computer; and (c) the AIM's OS 60 communicating with the mobile application 104.

The module descriptors and coding system 108 of the AIM device's OS 60 describe the structure, content, dependencies, filtering, and other attributes of the module 14 for collecting data using a specific sensor(s) and transceiver computed by the MCU.

The OS 60 communicates with the LPWAN and IoT service application 102, so that the AP services operate to process and transmit the data collected from the AIM sensor 14 over the IoT LoRa gateway 16 and/or communications link 18.

Figure 9:
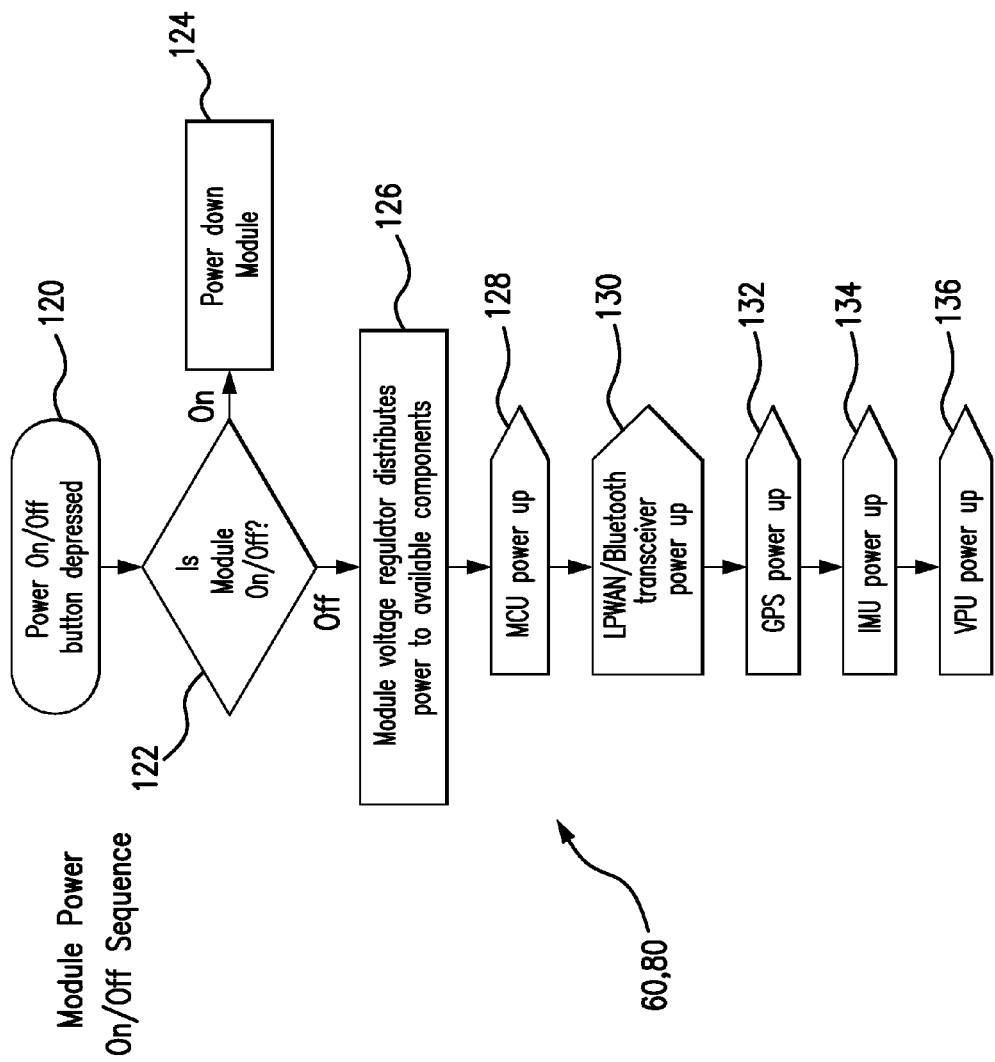
FIG. 9 is a flowchart diagram representative of the subject firearm sensor module power ON/OFF routine.

FIG. 9 is representative of the sequence of steps for module power ON/OFF. Referring to FIGS. 9, 3 and 8, the powering routine underlying the operation of the power unit 84 and supported by the software 60 is initiated in block 120 when the depression of the power ON/OFF button 90 is detected. Once the power ON/OFF button depression is detected in block 120, the logic follows to the logic block 122 where it is determined whether the sensor module is in current power ON or power OFF state. If the sensor module is powered ON, the logic flows to block 124 where the sensor module powering is turned OFF.

If, however, in the logic block 122, the logic determines that the sensor module 14 is in power OFF state, the power unit 84 supporting logic flows to step 126 where the voltage regulator 92 begins distributing power received from the lithium ion battery 58 to the components of the firearm sensor module 14, including powering up the Micro-Controller Unit (MCU) 42 in block 128, following by powering up the LoRa/BLE transceivers 38, 40 in step 130, following by powering up the GPS receiver 44 in step 132, following by powering up the Inertial Measurement Unit (IMU) 62 in step 134, and powering up the video processing unit 54 in step 136.

The sequence of the steps for powering up the components of the sensor node 14 is represented in FIG. 9 as an example only, and any other sequence for providing power to the components 32 of the AIM sensor 14 is contemplated in the subject system 10.

Figure 10:
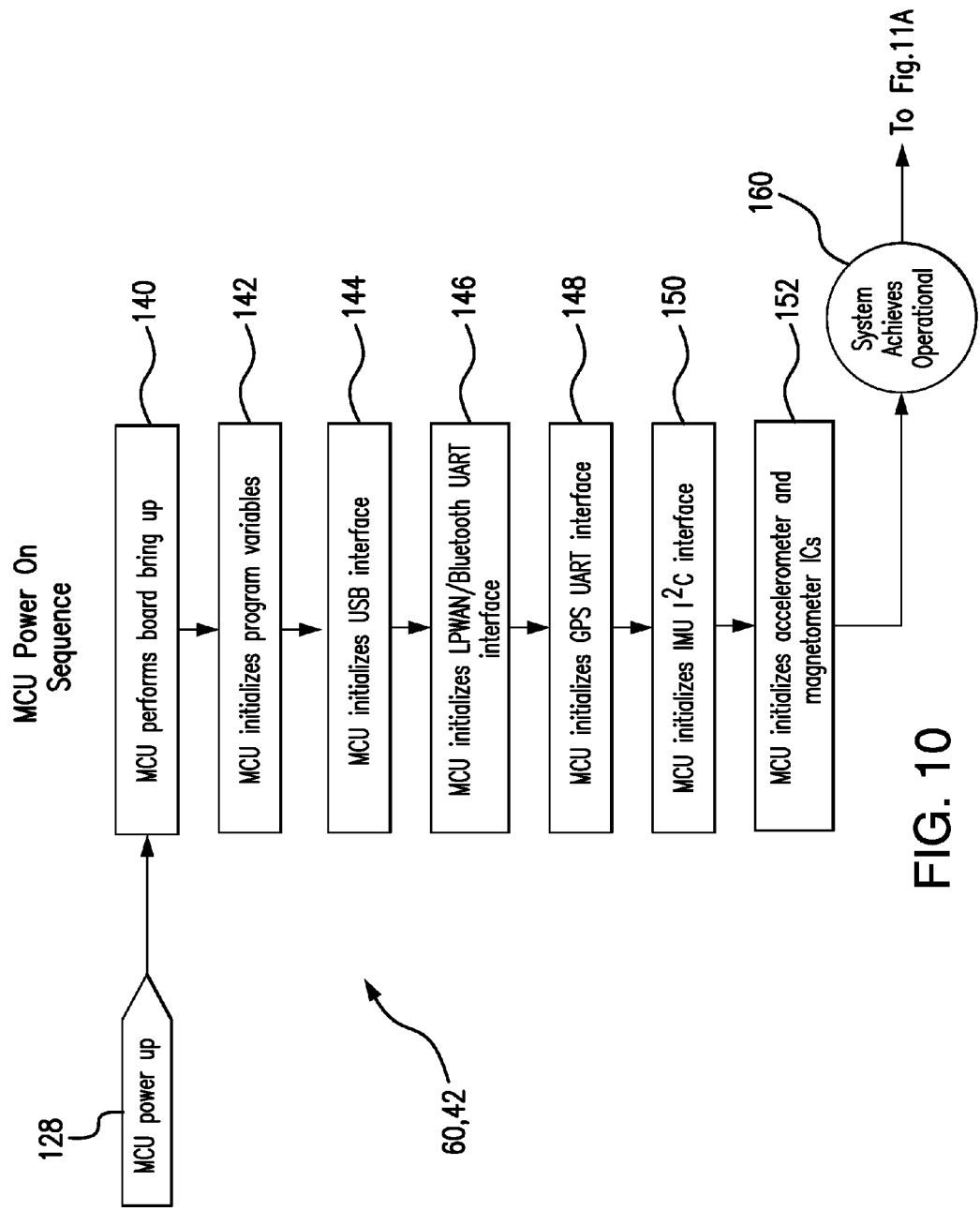
FIG. 10 is a flowchart diagram representative of the MCU power ON sequence.

Referring to FIG. 10, as well as FIG. 3, the routine performed by the MCU 42 as commanded by the software 60 underlying the operation of the MCU (upon being powered ON is step 128) is initiated in step 140 where the MCU 42 brings up the board 34.

In the subsequent step 142, the MCU 42 initializes program 60 variables to activate logic execution.

In the subsequent step 144, the MCU 42 initializes the USB interface 80, and in the subsequent step 146, the MCU initializes the LPWAN/Bluetooth UART (Universal Asynchronous Receiver/Transmitter) interface 98.

In the subsequent step 148, the MCU 42 initializes the GPS UART interface 99.

In the following step 150, the MCU initializes the I²C interface 96 of the IMU (Inertial Measurement Unit) 62 which is a multi-method, multi-slave, single-ended, serial computer bus used for attaching lower-peripheral ICS (such as the Inertial Measurement Unit 62) to the MCU 42 in the subject AIM sensor 14.

Subsequently to step 150, the MCU 42 initializes (in step 152) ICs (Integrated Circuits) of the accelerometer 50 and the magnetometer 48. Upon performing the routines in steps 140-152, the system achieves the operational mode (step 160).

It is to be understood that the sequence of operations illustrated in FIG. 10 is presented for an example purposes only, and alternative sequences of the routines performed by the MCU 42 (upon the powering up) to achieve the operational mode are contemplated in the present system.

Figure 11A:
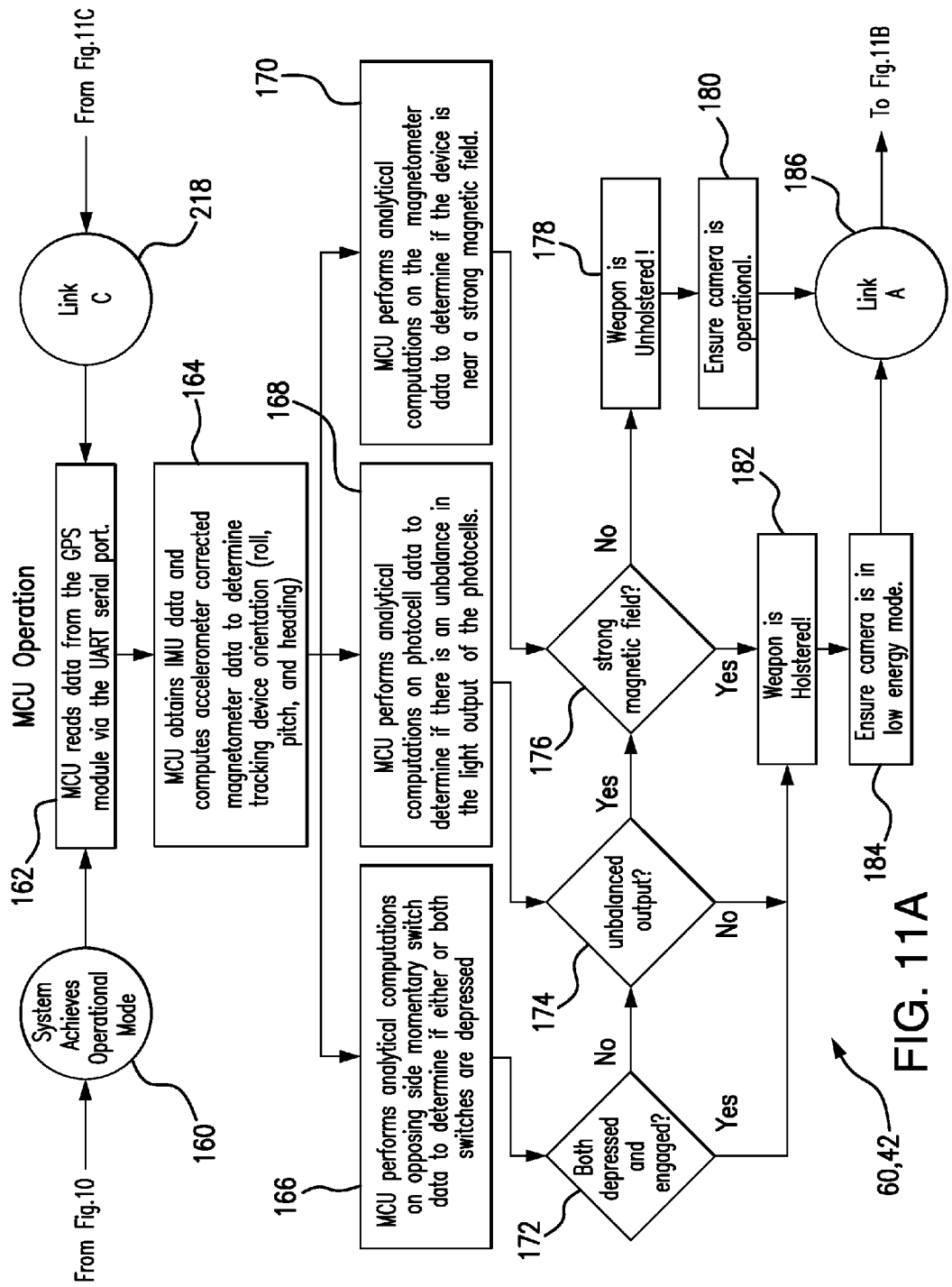
FIGS. 11A-11C are flowchart diagrams representative cumulatively of the MCU operations executed by the subject firearm sensor module.

Referring to FIGS. 11A and 3, upon achieving the operational mode 160, the logic flows to step 162 where the MCU 42 reads data from the GPS module 44 via the UART serial port 99. The GPS module (receiver) 44 is active when powered on, and gathers and transmits location data at preset time intervals (for example, every 10 seconds). However, where the firearm un-holstering event has been detected, the GPS location data is transmitted in real-time.

In the following step 164, the MCU 42 obtains the data from the IMU 62 and computes the accelerometer corrected magnetometer data to determine tracking device 3-D orientation, i.e. its role, pitch and heading.

Following the step 164, the MCU performs an analytical computation (in step 166) on the momentary switches 114 located at the opposite sides of the sensor module enclosure 30 to determine if either or both momentary switches 114 are depressed (or engaged).

From step 166, the routine further flows to logic block 172 to determine if both momentary switches 114 are depressed and engaged.

Momentary Switches 114 are placed at opposing sides of the sensor module enclosure 30 (as shown on FIG. 3) for the primary un-holster detection. The switches are depressed and engaged when the firearm 12 is placed within the holster (or other storage). Holsters are fitted to particular guns and will contact the switches 114 when properly used. Both switches 114 need to be depressed and engaged to signify that the gun 12 is holstered. When the firearm 12 is drawn from the holster, the momentary switches 114 are no longer engaged and depressed, and a signal is transmitted to the MCU 42 indicating that the firearm 12 may be un-holstered.

If in block 172 the logic determines that both momentary switches 114 are depressed and engaged, the logic flows to step 182 where it is determined that the weapon is holstered, and in the following step 184, the power unit 84 ensures that the camera 64 is in the low energy mode.

If however in the logic block 172 it is determined that either one or both momentary switches 114 are not depressed and engaged, the logic flows to logic block 174 (for a secondary determination and confirmation of the possible un-holstering event) where it is determined whether the situation is consistent with the unbalanced outputs of the photocell units 116.

In order to execute the logic routine in logic block 174, the MCU 42 performs (in step 168) analytical computations on the photocell units 116 data to determine if there is an unbalance in the light output of the photocells 116.

Two photocells 116 are positioned at opposite sides of the enclosure 30 of the AIM sensor 14, as shown in FIG. 3. The Photocell units 116 are used in addition to the momentary switches 114 as a secondary detection of a possible un-holstering event, i.e., to detect and confirm a possible un-holstering event.

The photocell units 116 are light-sensitive resistors which produce an output in correspondence to an amount of ambient (incident) light. When the holster is opened, or a firearm is removed from the holster or another storage device, the light level incident on the firearm changes, causing a corresponding change in the photocell output.

The photocell units 116 are assigned a predetermined output threshold level, a deviation from which is considered by the MCU as a possible un-holstering (or removal from a storage device) of the firearm. The MCU 42 is programmed to detect a deviation of each photocell's output from the threshold, as well as the unbalance of the outputs of the Photocells 116. If a sudden abrupt change in the light output of the photocells 116 is detected, the MCU 42 determines a possible un-holstering event, or removal of the weapon from a storage device. This routine can be executed in synchronization with the momentary switches detection, or immediately after the momentary switch disengagement has been detected. This feature can be activated/deactivated via the device firmware or by the application 60 running on the AIM sensor 14.

Based on the reading of light output of the photocells 116, the logic 60 (specifically the logic supporting the MCU 42 functionality) determines in block 174 if the output of the photocells 116 is unbalanced. If there is a balanced output, the logic flows to block 182, where it is determined that the weapon is holstered.

If, however, in block 174 the logic determines that the outputs of the photocells 116 are unbalanced, and/or the outputs deviate from a predetermined threshold level, the logic flows to logic block 176 to confirm the decision of the MCU 42 regarding the possible un-holstering event based on the momentary switches and photocells readings by determining whether there is a strong magnetic field present in the vicinity of the sensor module 14. Logic block 176 receives the data from step 170 where the MCU 42 performs an analytical computation on the magnetometer 48 data to determine if the AIM sensor 14 is located near a strong magnetic field.

If it is determined in logic block 176 that the firearm sensor unit 14 is located in proximity to a strong magnetic field, the logic makes the decision in step 182 that the weapon is holstered (or stored in a storage device).

If, however, it is determined in logic block 176 that there is not a strong magnetic field in the vicinity to the AIM sensor 14, the logic flows to step 178 where it is determined that the weapon is un-holstered, or removed from a storage device (thus confirming the decisions of the MCU 42 based on the momentary switches and photocells' readings), and further flows to block 180, where the logic ensures that the camera 64 is operational and initiated for capturing images.

Figure 11B:
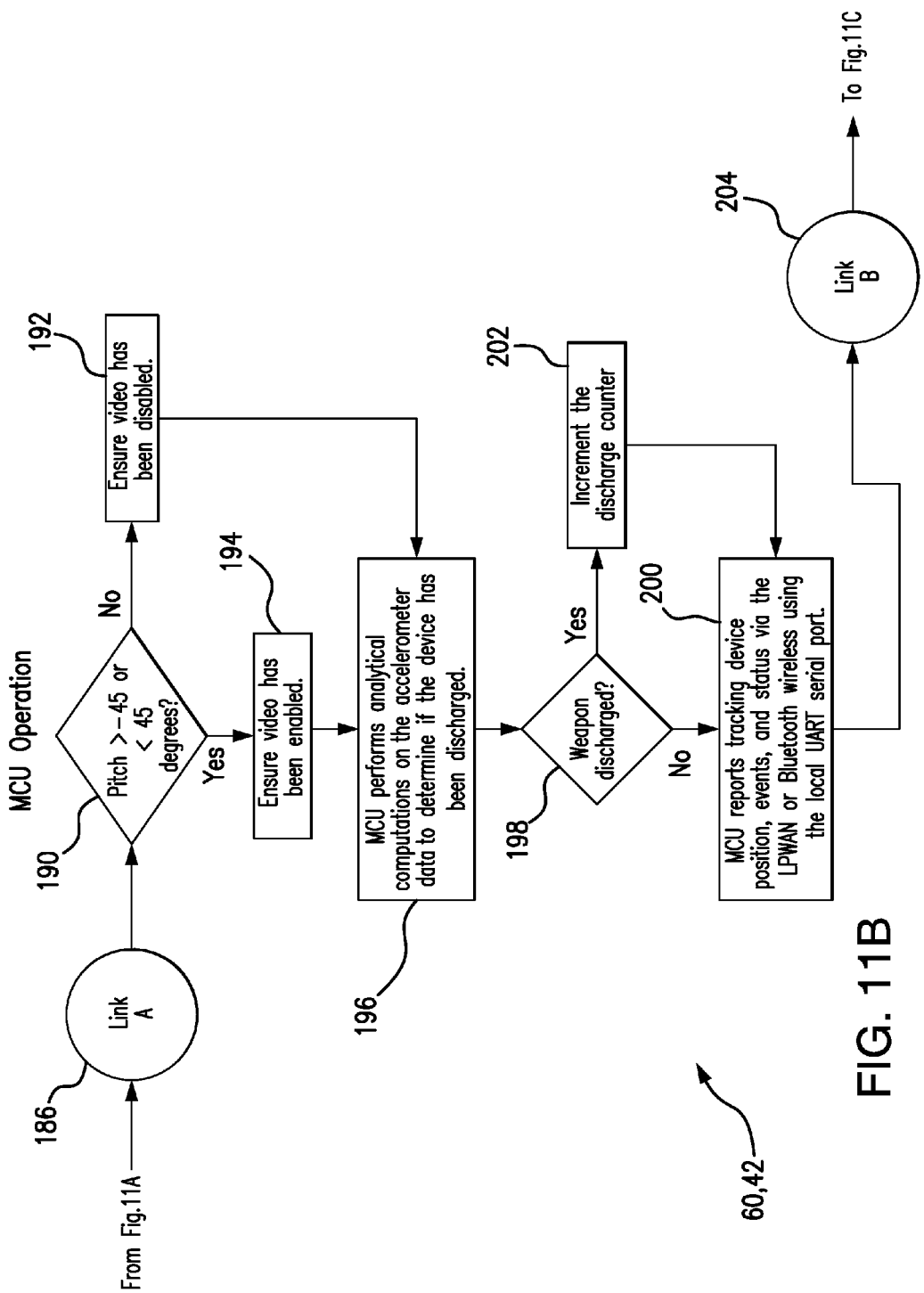

From block 180 and 184, the logic arrives to the system state 186 (link A) which continues to the routine shown in FIG. 11B. Particularly, from blocks 180 and 184, through the link 186 i.e., link A, the routine passes to the logic block 190 where the logic makes a decision whether the pitch of the device (as determined in step 164) falls in the range −45°-+45°. If the pitch falls in this range, the logic follows to step 194, where the MCU 42 operates to ensure that the video recording has been enabled.

In the following block 196, the MCU 42 performs analytical computations on the accelerometer data (acquired in step 164) to determine if the firearm (also referred to herein as the device) 12 has been discharged.

If, however, in logic block 190, it was determined that the pitch does not fall in the region between −45°-+45°, the logic flows to step 192 to ensure that the video recording has been disabled. From step 192, the logic flows to step 196 to perform analytical computations on the accelerometer data to determine if discharge has taken place.

From step 196, the procedure flows to the logic block 198 to determine whether the weapon has been discharged. If the weapon has been discharged, the logic flows to step 202 to increment the discharge counter, and subsequently to step 200 where the MCU 42 reports the firearm 12 position, events, and status via the LPWAN or Bluetooth wireless communication links using the local UART serial port 98.

If, however, in step 198 the decision has been made that the weapon is not discharged, the logic flows to step 200. From block 200 the system arrives at the state of the system 204 (link B).

Figure 11C:
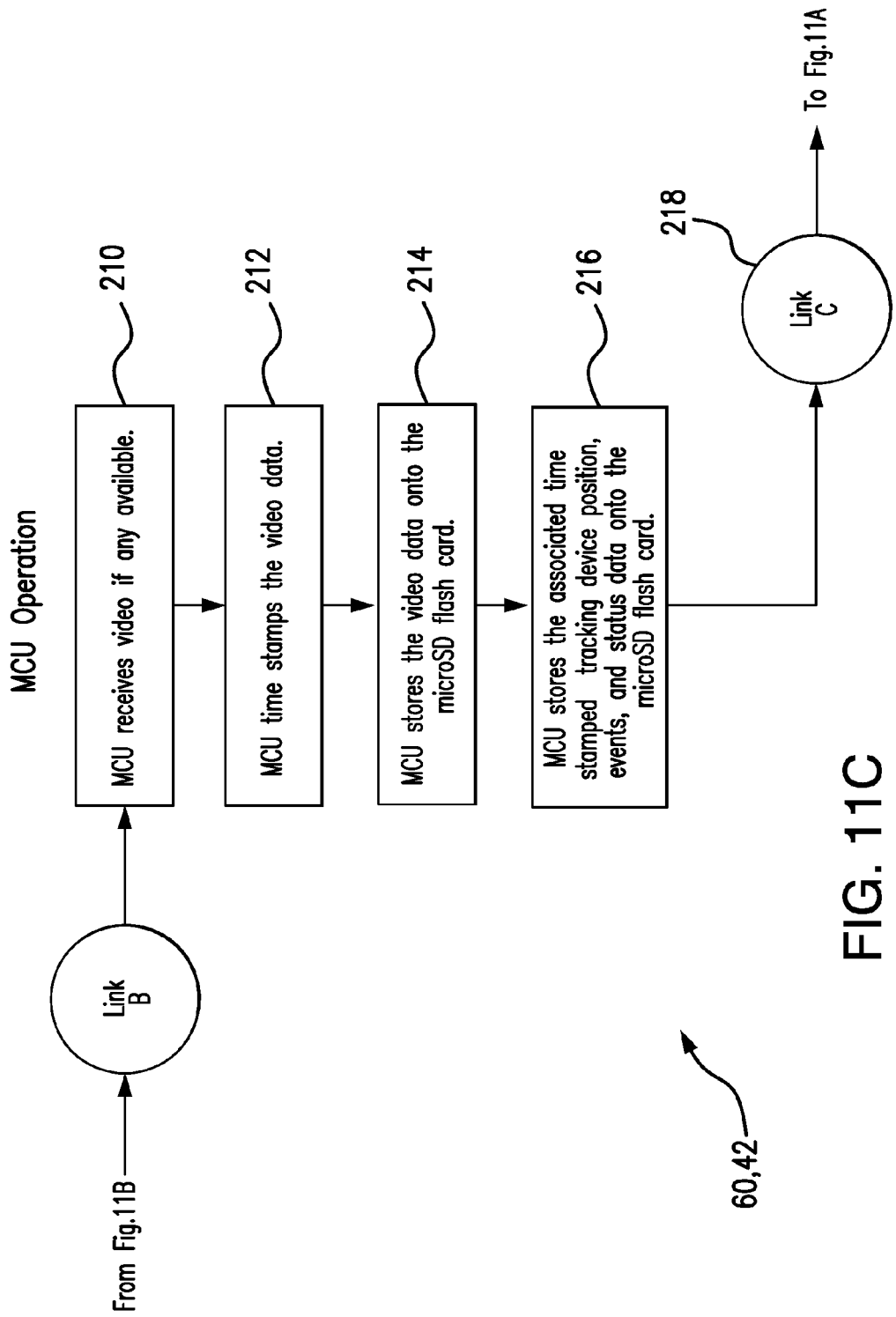

The MCU operation continues, as shown in FIG. 11C in conjunction with FIG. 3, where, upon the report having been received from the MCU 42 on the tracking device position, events and status, the logic flows to step 210 where the MCU receives the video data (if available).

The MCU timestamps the video data in step 212 (using the RTC unit 88), and stores the video data onto the micro SD flashcard 28 in step 214.

In the following step 216, the MCU 42 stores the associated timestamped tracking device 14's position, events, and status data on the micro SD flashcard 28. At this point, the system arrives to the state of the system 218 (link C).

From step 216, the logic passes to step 162, shown in FIG. 11A for further processing.

Figure 12:
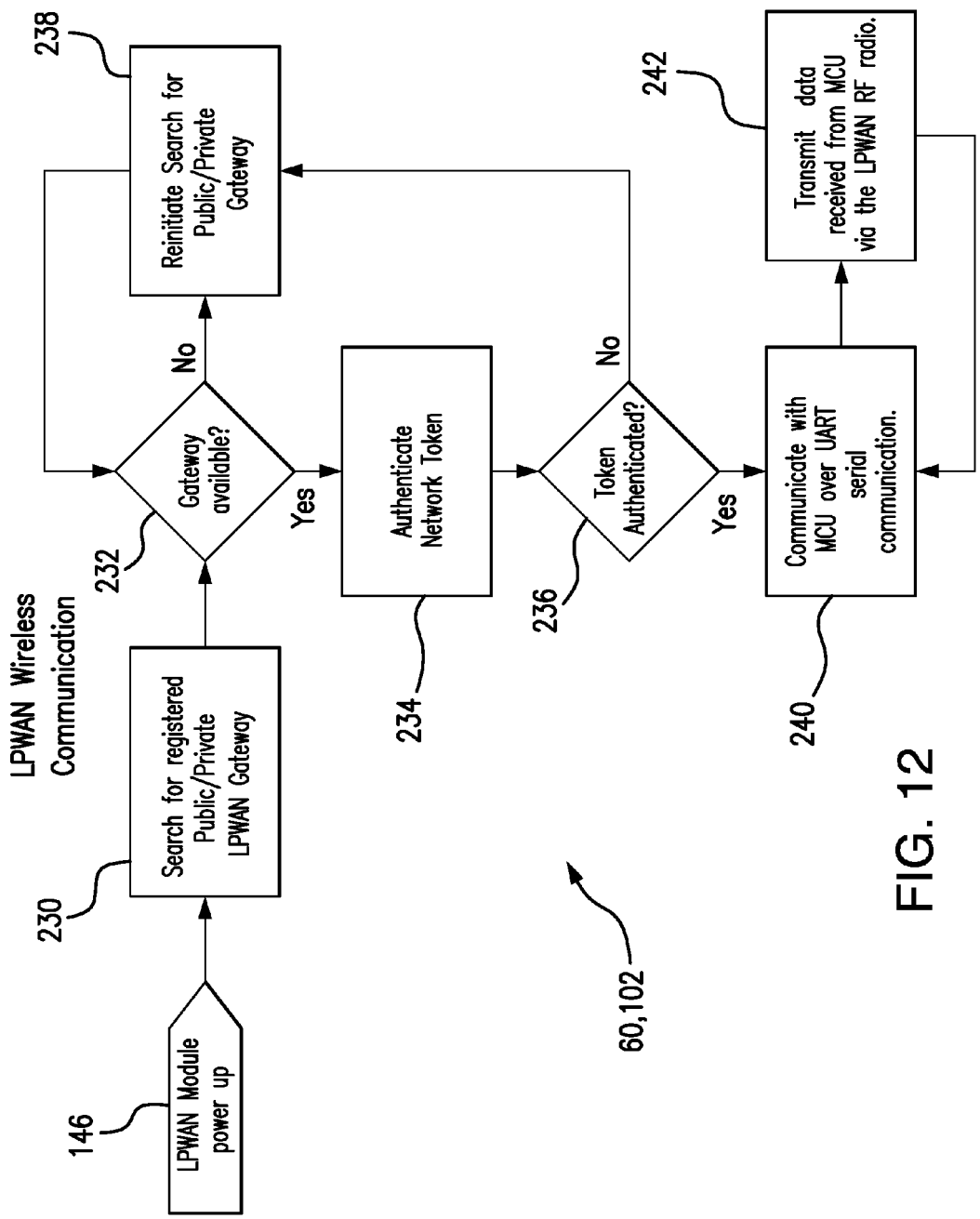
FIG. 12 is a flowchart diagram representative of the IoT LPWAN wireless communication routine executed by the subject firearm sensor module.

Referring to FIG. 12, representative of the software 60, 102 underlying the LoRa wireless communication operation, as well as FIGS. 3 and 8, upon the MCU 42 initializes the LPWAN module (transceiver) 38 module in step 146 (shown in FIG. 9), the LPWAN transceiver 38 searches in step 230 for a registered public/private LPWAN gateway, and a decision is made in the subsequent logic block 232 whether the gateway is available.

If in logic block 232, the decision has been made that no gateway is available for communication, the routine flows to step 238 to re-initiate search for public/private gateway, and the logic loops back to logic block 232.

If, however, the gateway is available, the logic underlying the LPWAN wireless communication operation, flows to step 234 to authenticate the network security token. A security token (sometimes called an authentication token) is a small hardware device that may be installed on the sensor module 14 or carried by the firearm user to authorize access to a network service. The security token provides an extra level of assurance through a two-factor authentication, via a personal identification number (PIN), which authorizes the user as the owner of that particular device, and via a number which uniquely identifies the user to the service, allowing the log in. The identification number for each user may be changed frequently, for example, each several minutes or so.

If in logic block 236 (subsequent to step 234), the security token has been authenticated, the logic flows to step 240, where the LPWAN wireless transceiver 38 communicates with the MCU 42 over the UART serial communication 98.

If, however, in logic block 236, the token is not authenticated, the procedure follows to step 238 to re-initiate search for public/private gateway and the logic returns to logic block 232 to find another gateway available for operation.

From the step 240, the logic flows to step 242 to transmit data received from the MCU 42 via the LPWAN RF radio, and the process of the communication between the MCU and LPWAN RF radio continues.

Figure 13:
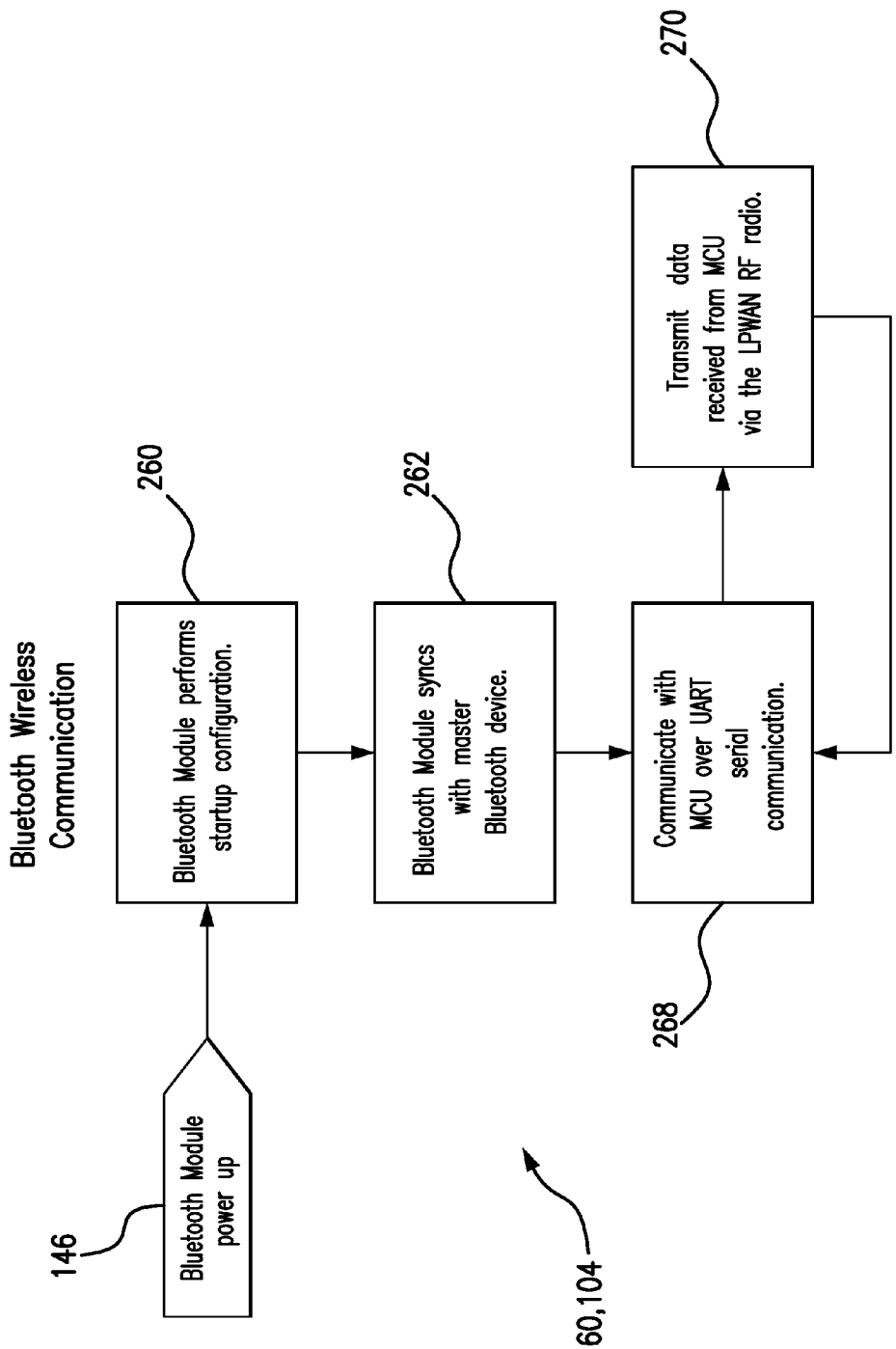
FIG. 13 is a flowchart diagram representative of the Bluetooth wireless communication routine executed by the subject firearm sensor module.

Referring further to FIG. 13, as well as FIGS. 3 and 8, upon the Bluetooth module (transceiver) 40 is powered up in step 146 (as detailed in FIG. 9), the logic 60, 104 underlying the operation of the Bluetooth wireless communication unit performs the Bluetooth module start up configuration in step 260. Subsequently, in step 262, the Bluetooth wireless communication module synchronizes with master Bluetooth device.

Sequentially, in step 268, the Bluetooth module communicates with the MCU 42 over the UART serial interface 98 in step 268, and in step 270, data received from the MCU are transmitted via the LPWAN RF radio.

From step 270, the logic loops back to step 268 to support the communication with the MCU, and the transmission of data received from the MCU via the LPWAN RF radio.

Figure 14:
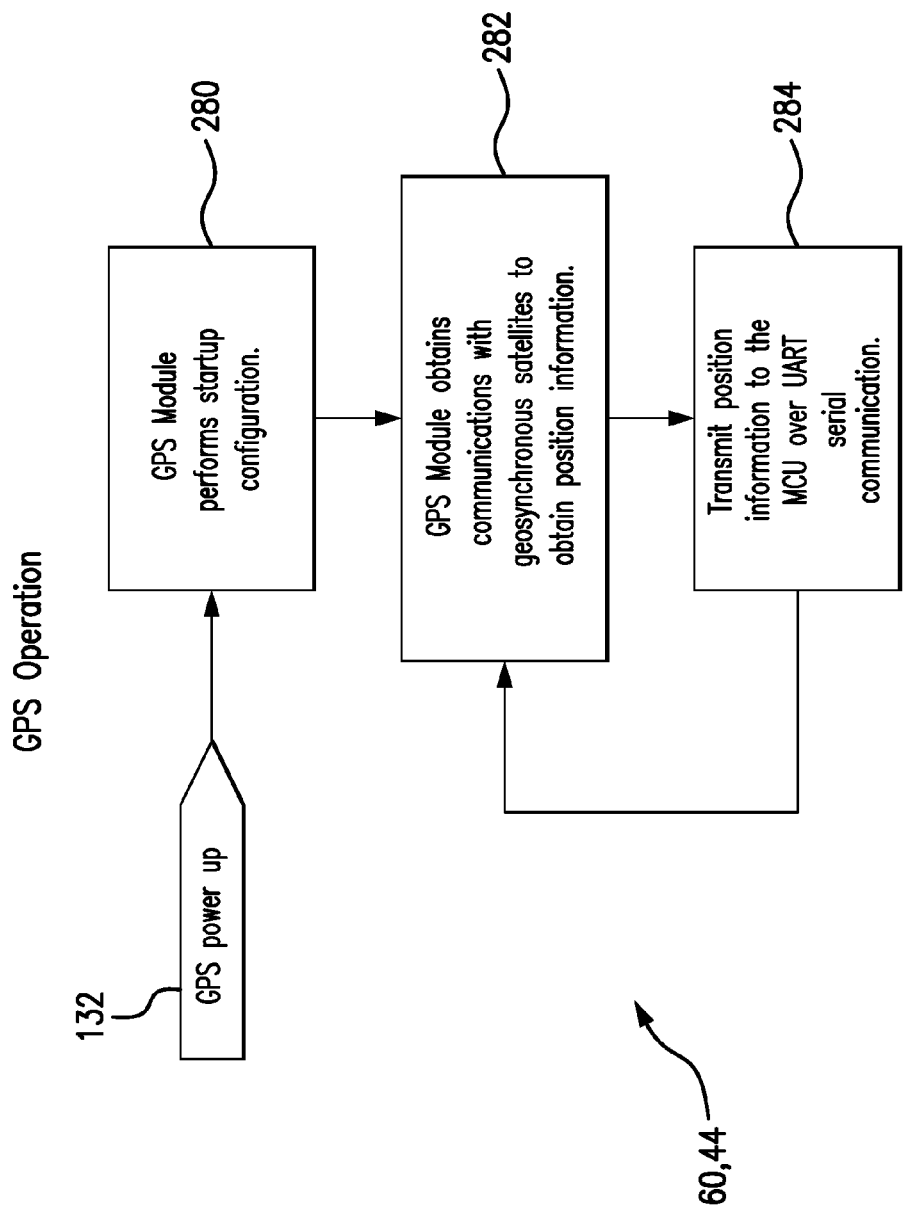
FIG. 14 is a flowchart diagram representative of the GPS module operation executed in the subject firearm sensor module.

Referring to FIGS. 14, 3 and 8, subsequent to the step 132 of the powering up the GPS 44 (as shown in FIG. 9), the logic 60, 44 underlying the GPS module operation performs start up configuration in step 280, and follows to step 282 where the GPS module establishes the communication with Geosynchronous satellite to obtain positional information.

Subsequent to step 282, the GPS logic follows to step 284 to transmit positional information to the MCU 42 over the UART serial interface 99, and loops back to step 282 to continually obtain and transmit position information.

Figure 15:
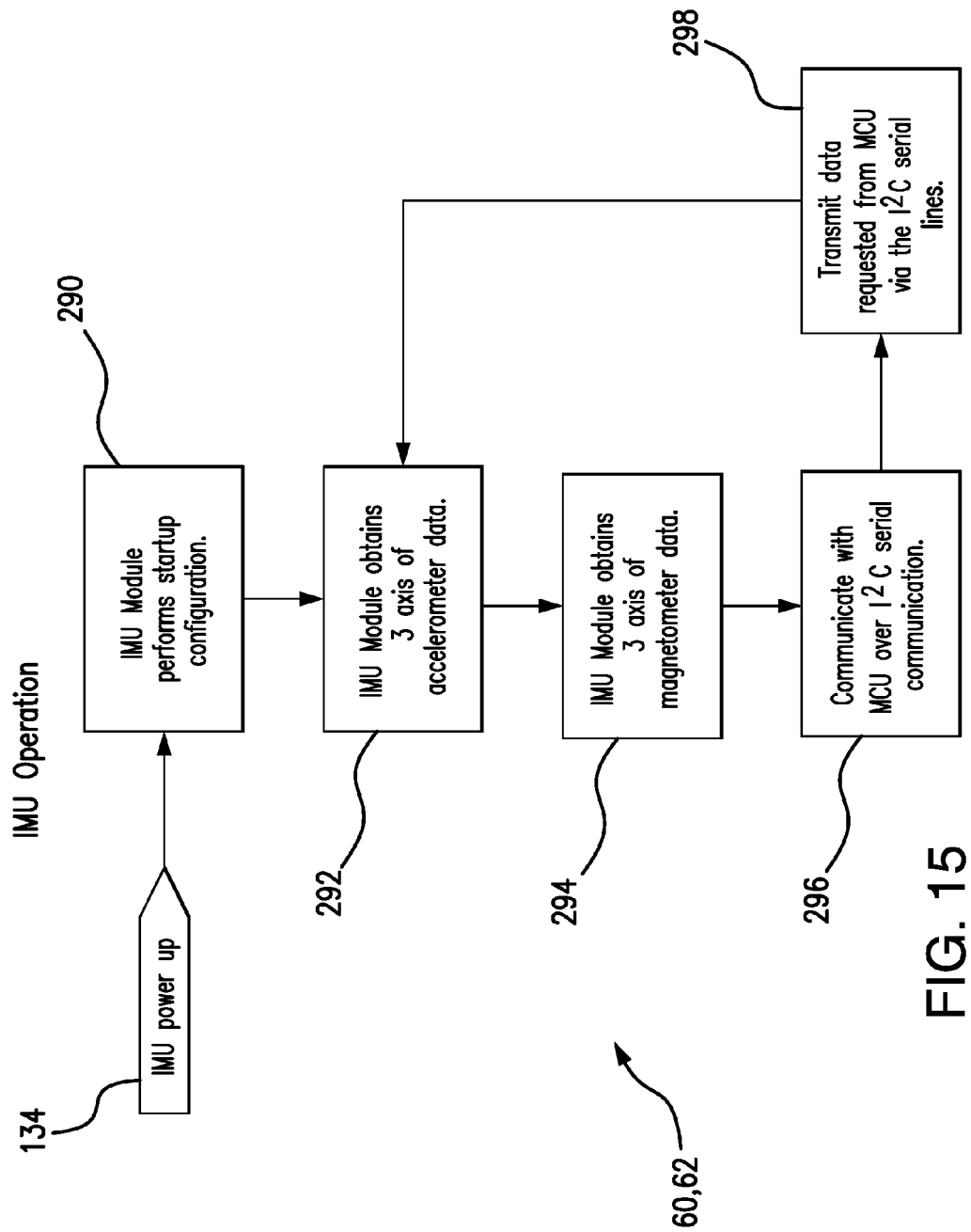
FIG. 15 is a flowchart diagram representative of the IMU routine executed in the subject firearm sensor module.

Referring to FIG. 15, representative of the routine 60, 62 underlying the IMU operation, upon powering up the Inertial Measurement Unit 62 in step 134 (as detailed in FIG. 9), the logic underlying the IMU operation follows to step 290 where the IMU module 62 performs start up configuration.

In the following step 292, the IMU module 62 obtains data for the 3 axis of the accelerometer, and in the following step 294 the IMU module obtains data for 3 axis of the magnetometer 48.

In the subsequent step 296, the IMU module 62 communicates with the MCU 42 over the I²C serial communication interface 96 and transmits data (in step 298), requested from the MCU via the I²C serial lines 96. From step 298, the logic returns to step 292 to repeat steps 292, 294, 296 and 298.

Figure 16:
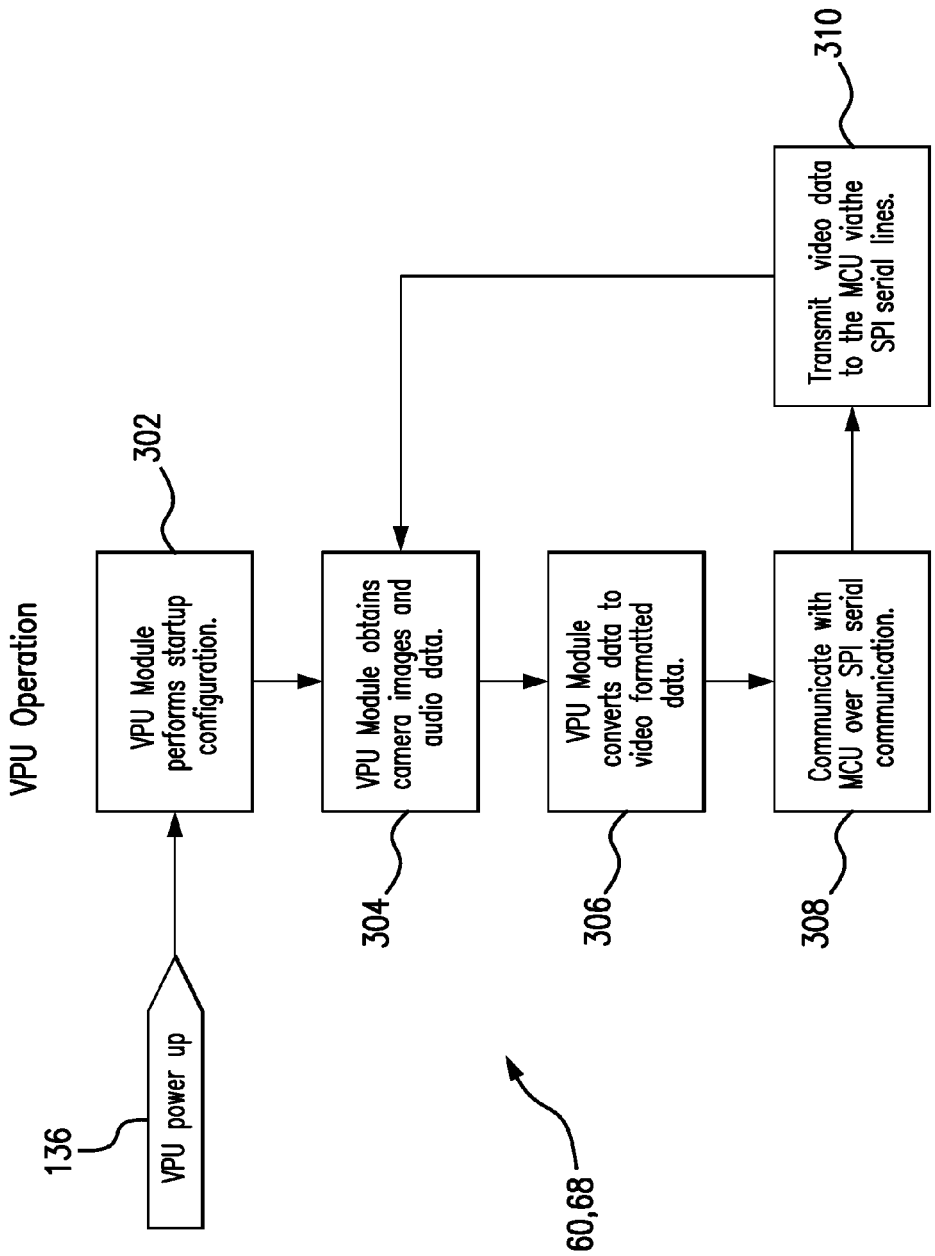
FIG. 16 is a flowchart diagram representative of the VPU operation executed in the subject firearm sensor module.

Referring to FIG. 16, representative of the routine underlying the video processing unit (VPU) operation, and returning to FIG. 3, upon the powering up the VPU 54 by the MCU 42 in step 136 (as represented in FIG. 9), the VPU module, in step 302, performs start up configuration and follows to step 304 where the VPU module obtains camera images and audio data.

The camera 64 is actuated when the firearm 12 is un-holstered (momentary switches 114 no longer engaged, the photocells 116 determine variance in ambient light, and a strong magnetic field is not detected).

When the firearm 12 (mounted with the AIM device 14) is raised past −45° after being un-holstered, the MCU 42 initiates the camera 64 recording until the firearm is returned into the holster (or a storage device) and the momentary switches 114 are engaged, and/or the photocells 116 determine the ambient light threshold set has been reached. The threshold for the decision making may be, for example, set approximately at 10 lux or 10 KΩ (Photocell resistance (Ω)).

Subsequently, in step 306, the VPU 68 converts data to video formatted data, and in step 308, the VPU 68 communicates with the MCU 42 over the SPI serial communication interface 312.

From step 308, the logic flows to step 310 where the video data is transmitted from the VPU to the MCU via the SPI serial lines 312, and the logic 60, 68 loops back to step 304 for continuous operations through steps 304, 306, 308, and 310, as required for the operation of the subject system.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A firearm critical event alert and response system, comprising:
   an Internet of Things (IoT) Automated Intelligence Module (AIM) positioned in operative communication with a firearm of interest and including an enclosure configured for attachment to the firearm of interest, said IoT AIM comprising components including:
   an Inertial Measurement Unit (IMU) configured to acquire intelligence data corresponding to at least one critical event and to produce at least one critical event detection signal,
   a Microcontroller Unit (MCU) operatively coupled to said IMU,
   a pair of photocell units disposed at the opposite sides of said enclosure in operative engagement with said MCU,
   a video unit activated upon detection of said at least one critical event, and composed of a video recording unit, and a video processing unit operatively coupled to said video recording unit, and configured to generate digital video signals from ages captured by said video recording unit,
   an audio unit activated upon detection of said at least one critical event, and composed of a microphone, and an audio processing unit operatively coupled to said microphone, and configured to generate digital audio signals sounds captured by said microphone,
   a real-time clock (RTC) unit operatively coupled to said video unit, said audio unit, and said IMU to timestamp said digital video and digital audio signals, said intelligence data, and said at least one critical event detection signal,
   an internal data storage unit operatively coupled to said IMU, said video and audio units, and said RTC unit to record said timestamped and synchronized said digital video and audio signals, said intelligence data, and said at least one critical event detection signal received therefrom, and
   a transceiver sub-system operatively coupled to said internal data storage unit and configured to interface with an external end-user sub-system to transmit thereto said timestamped and synchronized digital video and audio signals, said intelligence data, and said at least one critical event detection signal.

2. The system of claim 1, wherein said enclosure is configured for attachment to the firearm of interest through coupling to a structure including either of an accessory rail, a Picatinny rail mountable firearm accessory, a Weaver rail mountable firearm accessory, Picatinny/Weaver rail adapter, vertical foregrip, pistol grip, or the buttstock of the firearm of interest, wherein said components are arranged in a single board computer structure secured within said enclosure.

3. The system of claim 2, further including an external data repository, an IoT LPWAN Radio Frequency (RF) gateway, and/or cellular-based network, cloud-based servers, said external data repository residing at at least one of said cloud-based servers,
   wherein said components of said IoT AIM further include a LPWAN transceiver, a Bluetooth transceiver, and a Global Positioning System (GPS) receiver coupled to said LPWAN RF transceiver and paired to an internee-enabled mobile device via said Bluetooth transceiver, wherein a real-time location signal received at said GPS receiver is coupled to said LPWAN transceiver, and transmitted to the LPWAN RF gateway, the cellular-based network, internet-enabled mobile device, and said external data depository through said LPWAN and Bluetooth transceivers.

4. The system of claim 2, wherein said IoT AIM further includes a battery cell, and a Battery Charging Controller integrated in said enclosure for linear charging of said battery cell.

5. The system of claim 3, wherein said Microcontroller Unit (MCU) is further operatively coupled to said IMU, Video Unit, Audio Unit, Internal data storage unit, GPS receiver, and LPWAN and Bluetooth transceivers to coordinate and operatively support operational interrelation therebetween, wherein said MCU is configured to synchronize said timestamped digital video and digital audio signals, said acquired intelligence data, and said at least one critical event detection signal.

6. The system of claim 3, wherein said IoT ATM is configured with a logic underlying the routines of:
    detecting said at least one critical event including the firearm un-holstering event, the firearm discharge event, a number of the firearm discharges, and a ballistic parameters of the firearm at the time of discharge,
    determining the real-time location of the firearm of interest when activated by a predetermined condition or a manual activation, and recording the directionality of the firearm at the time of discharge,
    capturing still images of the firearm's line of sight when the firearm is in the firing-ready position,
    transmitting information indicating the unique identification, the real-time location, and the directionality of the firearm of interest directly to the LPWAN Radio Frequency (RF) gateway, the cellular-based network, and to said at least a server hosting said data repository and supported by an end user application accessible via an internet connected personal computer and at least one mobile device, and
    displaying at east one alert and at least one notification indicating the real-time location of the firearm of interest, the precise location of a firearm of interest when un-holstered or discharged, the directionality of a firearm of interest, and a breadcrumb trail of said firearm of interest location.

7. The system of claim 5, wherein said IMU in said IoT AIM further includes an accelerometer to measure acceleration forces applied to said firearm of interest and dynamic and static acceleration of the firearm of interest, and wherein said IMU is configured to process said measured acceleration forces and dynamic acceleration of the firearm of interest for detecting of said firearm discharge.

8. The system of claim 7, wherein said IMU further includes a magnetometer operatively coupled to said accelerometer, said magnetometer being configured to determine a 3-dimensional orientation of the firearm of interest.

9. The system of claim 8, wherein said IoT AIM further includes at least a pair of momentary switches disposed at the opposite sides of said enclosure in operative interrelation with said MCU, said momentary switches being engaged when said firearm of interest is inside a holster, and at least one of said momentary switches being disengaged when said firearm of interest is un-holstered, and wherein said MCU receives a signal from said momentary switches indicating termination of the engagement.

10. The system of claim 8, wherein said IMU is configured to analyze a direction of movement and an angle of the firearm of interest tilting at the time of the discharge based on the measured dynamic and static accelerations and the angle of tilting.

11. The system of claim 1, further including a Proximity sensor configured for detection of said at least one critical event, including the firearm un-holstering, or removal of the firearm from a designated storage device.

12. The system of claim 11, wherein said video recording unit is programmed to capture, upon actuation, images at a pre-set frame rate and a predetermined resolution, said captured images being digitized and stored, in the digitized format, on said internal data storage unit,
    wherein said internal data storage unit includes at least one of an integrated internal flash memory microchip, a solid state drive (SD), a Micro-SD flash card, and SD flashcard.

13. A firearm critical event alert add response system, comprising:
    an Internet of Things (IoT) Automated Intelligence Module (AIM) positioned in operative communication with a firearm of interest, said IoT AIM comprising components including:
    an Inertial Measurement Unit (IMU) configured to acquire intelligence data corresponding to at least one critical event and to produce at least one critical event detection signal,
    a video unit activated upon detection of said at least one critical event, and composed of a video recording unit, and a video processing unit operatively coupled to said video recording unit, and configured to generate digital video signals from images captured by said video recording unit,
    an audio unit activated upon detection of said at least one critical event, and composed of a microphone, and an audio processing unit operatively coupled to said microphone, and configured to generate digital audio signal sounds captured by said microphone,
    a real-time clock (RTC) unit operatively coupled to said video unit, said audio unit, and said IMU to timestamp said digital video and digital audio signals, said intelligence data, and said at least one critical event detection signal,
    an internal data storage unit operatively coupled to said IMU, said video and audio units, and said RTC unit to record said timestamped and synchronized said digital video and audio signals, said intelligence data, and said at least one critical event detection signal received therefrom,
    a transceiver sub-system operatively coupled to said internal data storage unit and configured to interface with an external end-user sub-system to transmit thereto said timestamped and synchronized digital video and audio signals, said intelligence data, and said at least one critical event detection signals,
    wherein said IoT AIM further includes an enclosure, said enclosure configured for attachment to the firearm of interest through a coupling to a structure including either of an accessory rail, a Picatinny rail mountable firearm accessory, a Weaver rail mountable firearm accessory, Picatinny/Weaver rail adapter, vertical foregrip, pistol grip, or the buttstock of the firearm of interest, wherein said components are arranged in a single board computer structure secured within said enclosure,
    an external data repository, an IoT LPWAN Radio Frequency (RF) gateway, and/or cellular-based network, cloud-based servers, said external data repository residing at at least one of said cloud-based servers, a LPWAN transceiver, a Bluetooth transceiver, and a Global Positioning System (GPS) receiver coupled to said LPWAN RF transceiver and paired to an internet-enabled mobile device via said Bluetooth transceiver, wherein a real-time location signal received at said GPS receiver is coupled to said LPWAN transceiver, and transmitted to the LPWAN RF gateway, the cellular-based network, internet-enabled mobile device, and said external data depository through said LPWAN and Bluetooth transceivers, a Microcontroller Unit (MCU) operatively coupled to said IMU, Video Unit, Audio Unit, Internal data storage unit, GPS receiver, and LPWAN and Bluetooth transceivers to coordinate and operatively support operational interrelation therebetween, wherein said MCU is configured to synchronize said timestamped digital video and digital audio signals, said acquired intelligence data, and said at least one critical event detection signal, an accelerometer to measure acceleration forces applied to said firearm of interest and dynamic and static acceleration of the firearm of interest, and wherein said IMU is configured to process said measured acceleration forces and dynamic acceleration of the firearm of interest for detecting of said firearm discharge, a magnetometer operatively coupled to said accelerometer, said magnetometer being configured to determine a 3-dimensional orientation of the firearm of interest, a pair of momentary switches disposed at the opposite sides of said enclosure in operative interrelation with said MCU, said momentary switches being engaged when said firearm of interest is inside a holster, and at least one of said momentary switches being disengaged when said firearm of interest is un-holstered, and wherein said MCU receives a signal from said momentary switches indicating termination of the engagement, and a pair of photocell units disposed at the opposite sides of said enclosure in operative engagement with said MCU, said MCU being configured to determine a deviation in light outputs of said photocell units from a predetermined light output threshold, indicative of a possible unholstering event.

14. The system of claim 13, wherein said MCU determines a possible un-holstering event based on combination of the momentary switches disengagement and the detection of said deviation of the light outputs of said photocell units.

15. The system of claim 14, wherein said MCU is further configured to perform analytical computations on said magnetometer data to determine the presence of a strong magnetic field, and, if no strong magnetic field is detected in vicinity of the firearm of interest, the MCU is configured to detect the firearm of interest un-holstering event.

16. An Internet of Things (IoT) sensor module mountable to a firearm of interest, comprising:

an enclosure, components of said IoT sensor module housed within said enclosure, said IoT sensor module components including:

a pair of momentary switches positioned at opposite sides of said enclosure, and a pair of photocell units disposed at opposite sides of said enclosure;

an Inertial Measurements Unit (IMU) including:

an accelerometer measuring dynamical and static accelerations of said firearm, and a magnetometer measuring a 3-dimensional orientation of said firearm of interest; and a Micro-Controller Unit (MCU) operatively coupled to said IMU, said momentary switches, and said photocell units, wherein said MCU is configured to process signals received from said momentary switches to determine whether said momentary switches are engaged, to process light outputs of said photocell units to determine whether said light outputs are balanced, and to process an output of said magnetometer to determine presence of a magnetic field, and to detect the firearm un-holstering event if at least one of said pair of momentary switches is disengaged, the light outputs of said photocell units are un-balanced, and a magnetic field is absent in vicinity to said firearm of interest, and wherein said MCU is further configured to process said accelerometer measurements to determine the firearm discharge based upon said measured dynamic acceleration, and to determine an angle of said firearm tilting based on said magnetometer readings.

17. The IoT sensor module of claim 16, further including a video unit composed of a video recording unit extending externally of said enclosure, and a video processing unit operatively coupled to said video recording unit, and configured to generate digital video signals from images captured by said video recording unit, an audio unit composed of a microphone extending external of said enclosure, and an audio processing unit operatively coupled to said microphone, and configured to generate digital audio signals sounds captured by said microphone, and a real-time clock (RTC) unit operatively coupled to said video unit, said audio unit and said IMU to timestamp said digital video and digital audio signals, and intelligence data related to at least one critical event detection acquired by said components of said IoT sensor module, wherein said MCU is further configured to synchronize said timestamped intelligence data and said digital video and audio signals.

18. The IoT sensor module of claim 17, further including:

an internal data storage unit operatively coupled to said IMU, said video and audio units, and said RTC unit to record said timestamped and synchronized digital video and audio signals, and said intelligence data related to said at least one critical event detection, and a transceiver sub-system operatively coupled to said internal data storage unit and configured to communicate with an external end-user sub-system to transmit thereto said timestamped and synchronized digital video and audio signals and acquired intelligence data, and said at least one critical event detection signal.

19. The IoT sensor module of claim 18, further including a LPWAN transceiver, a Bluetooth transceiver, and a Global Positioning System (GPS) receiver coupled to said LPWAN RF transceiver and paired to an internet-enabled mobile device via said Bluetooth transceiver, wherein said firearm of interest real-time location signal received at said GPS receiver is coupled to said LPWAN transceiver and is transmitted to an external LPWAN RF gateway, an external cellular-based network, an external internet-enabled mobile device, and an external data depository through said LPWAN and Bluetooth transceivers.

20. The IoT sensor module of claim 19, configured with a logic underlying the routines of:
- determining the real-time location of the firearm of interest when activated by a predetermined condition or a manual activation, recording the directionality of the firearm at the time of discharge,
- capturing still images of the firearm's line of sight when the firearm is in the firing-ready position;
- transmitting information indicating the unique identification, the real-time location, and the directionality of the firearm of interest directly to the LPWAN Radio Frequency (RF) gateway, the cellular-based network, and to said at least a server hosting said data repository and supported by an end user application accessible via an internet connected personal computer and at least one mobile device, and
- displaying at least one alert and at least one notification indicating the real-time location of the firearm of interest, the precise location of a firearm of interest when un-holstered or discharged, the directionality of a firearm of interest, and a breadcrumb trail of said firearm of interest location.

\* \* \* \* \*